US008781204B2

(12) United States Patent
Lohweg et al.

(10) Patent No.: US 8,781,204 B2
(45) Date of Patent: Jul. 15, 2014

(54) AUTHENTICATION OF SECURITY DOCUMENTS, IN PARTICULAR OF BANKNOTES

(75) Inventors: Volker Lohweg, Bielefeld (DE); Eugen Gillich, Bielefeld (DE); Johannes Schaede, Würzburg (DE)

(73) Assignee: KBA-Notasys SA, Lausanne (CH)

( * ) Notice: Subject to any disclaimer, the term of this patent is extended or adjusted under 35 U.S.C. 154(b) by 1079 days.

(21) Appl. No.: 12/602,227

(22) PCT Filed: Jun. 2, 2008

(86) PCT No.: PCT/IB2008/052135

§ 371 (c)(1), (2), (4) Date: Nov. 30, 2009

(87) PCT Pub. No.: WO2008/146262

PCT Pub. Date: Dec. 4, 2008

(65) Prior Publication Data

US 2010/0195894 A1 Aug. 5, 2010

(30) Foreign Application Priority Data

Jun. 1, 2007 (EP) .................................... 07109470
Jun. 20, 2007 (EP) .................................... 07110633

(51) Int. Cl.
*G06K 9/00* (2006.01)
*G06K 9/36* (2006.01)

(52) U.S. Cl.
USPC .......................................... 382/135; 382/276

(58) Field of Classification Search
USPC .......................... 382/135, 190, 276, 281, 282
See application file for complete search history.

(56) References Cited

U.S. PATENT DOCUMENTS 5,884,296 A 3/1999 Nakamura et al.
6,899,215 B2 * 5/2005 Baudat et al. ................ 194/328

(Continued)

FOREIGN PATENT DOCUMENTS

EP 1484719 8/2004
EP 1864825 12/2007

(Continued)

OTHER PUBLICATIONS

Choi, Euisun et al., "Feature Extraction for Bank Note Classification Using Wavelet Transform," IEEE, 18th International Conference on Pattern Recognition (ICPR'06) vol. 2 (2006) pp. 934-937.

(Continued)

*Primary Examiner* — John Strege
(74) *Attorney, Agent, or Firm* — Seager, Tufte & Wickhem LLC

(57) ABSTRACT

There is described a method for checking the authenticity of security documents, in particular banknotes, wherein authentic security documents comprise security features printed, applied or otherwise provided on the security documents, which security features comprise characteristic visual features intrinsic to the processes used for producing the security documents. The method comprises the steps of (i) acquiring a sample image of at least one region of interest of the surface of a candidate document to be authenticated, which region of interest encompasses at least part of the security features, (ii) digitally processing the sample image by performing a decomposition of the sample image into at least one scale sub-space containing high resolution details of the sample image and extracting classifying features from the scale sub-space, and (iii) deriving an authenticity rating of the candidate document based on the extracted classifying features.

40 Claims, 23 Drawing Sheets

(56) References Cited

U.S. PATENT DOCUMENTS

| | | | | |
|---|---|---|---|---|
| 7,644,281 | B2 * | 1/2010 | Deguillaume et al. | 713/176 |
| 7,684,607 | B2 * | 3/2010 | Joshi et al. | 382/137 |
| 7,920,714 | B2 * | 4/2011 | O'Neil | 382/100 |
| 8,194,933 | B2 * | 6/2012 | Lei et al. | 382/112 |
| 2004/0247169 | A1 | 12/2004 | Ross et al. | |
| 2004/0263911 | A1 * | 12/2004 | Rodriguez et al. | 358/3.28 |
| 2005/0229010 | A1 * | 10/2005 | Monk et al. | 713/186 |
| 2008/0030798 | A1 * | 2/2008 | O'Neil | 358/448 |
| 2009/0128858 | A1 | 5/2009 | Kiuchi et al. | |

FOREIGN PATENT DOCUMENTS

| | | |
|---|---|---|
| GB | 1379764 | 1/1975 |
| NL | 7017662 | 6/1972 |
| NL | 7410463 | 2/1976 |
| NL | 9401796 | 6/1996 |
| NL | 9401933 | 7/1996 |
| WO | 2006/106677 | 12/2006 |
| WO | 2007/105891 | 9/2007 |

OTHER PUBLICATIONS de Heij, Hans A.M., "Public Feedback for Better Banknote Design," Proceedings of SPIE vol. 6075 (2006) pp. 1-40.

de Heij, Hans A.M., "The Design Methodology of Dutch Banknotes," Proceedings of SPIE vol. 3973 (2000) pp. 2-22.

Mallat, Stephane G., "A Theory for Multiresolution Signal Decomposition: The Wavelet Representation," IEEE Transactions on Pattern Analysis and Machine Intelligence, vol. 11, No. 7, Jul. 1989, pp. 674-693.

van Renesse, Rudolf L., "Optical Inspection Techniques for Security Instrumentation," Proceedings of SPIE vol. 2659 (1996) pp. 159-167.

* cited by examiner (original specimen – Fig. 2b)

(original specimen – Fig. 2b)

(original specimen – Fig. 2b)

(colour copy 1 – Fig. 3b)

(colour copy 2 – Fig. 4b)

horizontal details:

vertical details:

diagonal details:

AUTHENTICATION OF SECURITY DOCUMENTS, IN PARTICULAR OF BANKNOTES

TECHNICAL FIELD

The present invention generally relates to the authentication of security documents, in particular of banknotes. More precisely, the present invention relates to a method for checking the authenticity of security documents, in particular banknotes, wherein authentic security documents comprise security features printed, applied or otherwise provided on the security documents, which security features comprise characteristic visual features intrinsic to the processes used for producing the security documents. The invention further relates to a digital signal processing unit adapted for carrying out part of the authentication method, a device for carrying out the authentication method, a method for producing security documents aimed at optimising the authentication of the security documents according to the authentication method, as well as to a method for detecting security features printed, applied or otherwise provided on security documents, in particular banknotes.

BACKGROUND OF THE INVENTION

Counterfeiting of security documents, especially of banknotes, is and remains a major concern for the industry and the economy around the world. Most counterfeited banknotes are produced using common imaging and printing equipment that is readily available to any user on the consumer market. The advent of scanners and colour copiers, as well as high-resolution colour printers making use of widespread printing processes, such as ink-jet printing, thermal printing and laser printing, makes it easier and easier to produce substantial volumes of counterfeited security papers. Most banknote counterfeits are produced by means of the above-mentioned imaging and printing equipment and can be designated as "colour copies".

Offset-printed forgeries, or "offset counterfeits" printed using commercial offset printing presses do also exist. These counterfeits are often printed in screen offset (i.e. with multicolour screen or raster combinations that are characteristic of commercial offset printing) and/or line offset (i.e. without any screen or raster combinations).

Most genuine banknotes combine high quality printed features created by intaglio printing, line offset printing with high precision recto-verso register, and letterpress printing. Intaglio and line offset in particular allow the creation of high resolution patterns with great print sharpness. Letterpress printing is typically used for printing variable information, such as serial numbers. Further printing or processing techniques are also exploited to print or apply other features on banknotes, such as silk-screen printing, foil stamping, laser marking or perforating, etc.

Skilled persons having some knowledge of the processes involved in the context of the production of banknotes and like security documents do not as such have much difficulty in differentiating most forged documents from a genuine document. A close look at a forged document using simple means such as a magnifying glass typically makes it possible to immediately identify the characteristic features intrinsic to genuine security documents, such as the intaglio-printed security patterns that are present on most banknotes as already mentioned. This however requires some expertise and knowledge about security printing which is not necessarily present amongst the public at large. In practice, most individuals are relatively easily deceived by forgeries as long as the general look of the counterfeit or copy is substantially similar to that of the genuine document. This represents not only a problem in the context of banknote counterfeiting, but also as regards forgery of other types of valuable documents, such as checks, duty stamps, identification and travel documents, etc.

Machine-based authentication of security documents, i.e. automatic recognition in document processing systems such as vending machines, automatic teller machines (ATM), note acceptors and similar financial transaction machines, is also affected by counterfeiting. Indeed, it is not unusual to discover rather more advanced forgeries of security documents which also replicate the machine-readable security features present on genuine documents, such as infrared, luminescent and/or magnetic markings. As a matter of fact, most machine-based authentication systems essentially focus on such machine-readable features and do not or barely proceed to an actual visual inspection of the visible security features printed, applied or otherwise provided onto the security documents.

In other words, the characteristic visual features intrinsic to the processes used for producing the security documents (especially intaglio patterns, line offset patterns, letterpress patterns and/or optically-diffractive structures) have barely been exploited in the context of machine-based authentication.

An exception is the so-called ISARD technology, which was invented and developed by TNO Institute of Applied Physics in the late sixties on behalf of the National Bank of the Netherlands. ISARD stands for Intaglio Scanning And Recognition Device and is based on a measurement of the characteristic relief profile of intaglio-printed features. A discussion of this authentication principle may for instance be found in the following papers:

[Ren96] Rudolf L. van Renesse, "Optical Inspection techniques for Security Instrumentation", IS&T/SPIE's Symposium on Electronic Imaging, Optical Security and Counterfeit Deterrence Techniques I, San José, Calif., USA (Jan. 28-Feb. 2, 1996), Proceedings of SPIE vol. 2659, pp. 159-167;

[Hei00] Hans A. M. de Heij, De Nederlandsche Bank NV, Amsterdam, the Netherlands, "The design methodology of Dutch banknotes", IS&T/SPIE's 12th International Symposium on Electronic Imaging, Optical Security and Counterfeit Deterrence Techniques III, San José, Calif., USA (Jan. 27-28, 2000), Proceedings of SPIE vol. 3973, pp. 2-22; and

[Hei06] Hans A. M. de Heij, De Nederlandsche Bank NV, Amsterdam, the Netherlands, "Public feedback for better banknote design", IS&T/SPIE's International Symposium on Electronic Imaging, Optical Security and Counterfeit Deterrence Techniques VI, San José, Calif., USA (Jan. 17-19, 2006), Proceedings of SPIE vol. 6075, 607501, pp. 1-40.

The ISARD authentication principle and a device for carrying out this principle are also disclosed in patent publications GB 1 379 764 (corresponding to NL 7017662), NL 7410463, NL 9401796 and NL 9401933.

A problem with the ISARD approach is that it is highly dependent on the degree of wear and use of the documents and the presence of wrinkles in the substrate of the banknotes, which elements directly affect the actual relief profile on the intaglio imprints and its detection by ISARD. ISARD technology was for instance applied as a pattern of parallel intaglio-printed lines on the Dutch 50 guilder "Sunflower" note (issued in 1982), as well as on the current issue of Euro banknotes (see [Hei06]). In practice, the ISARD was and is mainly exploited by the public at large to perform a nail scratching test (i.e. by scratching a nail over the pattern of parallel intaglio lines).

Further solutions to fight counterfeiting and possibly enable machine-based authentication may consist in integrating specific authentication coding in the security document itself, for instance by using specific taggant materials, such as rare-earth components incorporated in the inks or embedded in the paper, or by hiding the authentication coding in the printed patterns themselves using so-called digital watermarking techniques. The integration of specific authentication coding in the security document however implies a specific processing of the document during the design and/or production phase, and a corresponding specifically-designed authentication technique. This accordingly increases the burden on the designer and/or printer to adapt the design process and/or production process of the security documents, and also means that specific detection technology has to be used for the purpose of the authentication process.

A solution based on the integration of specific coding in a printed pattern is for instance disclosed in European patent application EP 1 864 825 A1 (which corresponds to the entry into the European phase of International application No. WO 2006/106677 A1) discloses a printed product and method for extracting information from the printed product wherein information is embedded (or coded) in a printed design, especially a guilloche pattern, in such a way that this information can be detected by subjecting a sample image of the pattern to a Fourier transform. Coding of the information is achieved by spatially modulating the spacing between parallel/concentric curvilinear image elements. Such spatial modulation leads to the production of spectral peaks in the Fourier-transformed spectral image of a sample image of the pattern, which spectral peaks are indicative of the information embedded in the printed design and can thus be decoded. More precisely, according to European patent application EP 1 864 825 A1, the encoded information is extracted by looking at the spectral peak intensities.

A disadvantage of this approach resides in the fact that a specific coding must be embedded in a particular way in the printed patterns to permit decoding. This accordingly imposes substantial restrictions upon the designer who must follow specific design rules to design the printed patterns. In practice, the teaching of European patent application EP 1 864 825 A1 is basically limited to the embedding of information in guilloche patterns as this can readily be seen from looking at the Figures of EP 1 864 825 A1.

The approach disclosed in European patent application EP 1 864 825 A1 is for instance applied with a view to encode information on a personal certificate (such as an identity card, driver licence, or the like), which information relates to the owner/bearer of the personal certificate. The owner-dependent information is encoded into a guilloche pattern printed onto the personal certificate. This accordingly makes it more difficult for counterfeiters to produce similar personal certificates as the information embedded in the guilloche pattern is user-dependent. However, any copy of the personal certificate produced at a similar resolution as the original will exhibit exactly the same information as the original. This approach is thus mainly suitable for the purpose of authenticating security documents intended to bear user-dependent information (which is not the case of banknotes for instance).

U.S. Pat. No. 5,884,296 discloses a device for discriminating an attribute of an image in a block area contained in a document image, which device involves performing a Fourier transformation based on image data in the block area and determining a spatial frequency spectrum relating to the image in the block area. A neural network is exploited to output a discrimination result as to whether or not the attribute of the image in the block area is a halftone dot image based on the spatial frequency spectrum outputted from the Fourier transformation. This device is in particular intended to be used in digital copying machines for the purpose of improving image quality. The device of U.S. Pat. No. 5,884,296 is more particularly intended to be used in the context of the copying of documents containing a mixture of text images, photographic images and/or dot images, which attributes needs be processed separately to yield good image quality in the copied documents. U.S. Pat. No. 5,884,296 does not in any way deal with the issue of authenticating security documents, but rather relates to a solution aimed at improving the discrimination between different attributes of an image.

European patent application No. EP 1 484 719 A2 discloses a method for developing a template of a reference document, such as a banknote, and using that template to validate other test documents, especially for validating currency in an automated teller machine. The method involves using images of a plurality of reference documents, such as genuine banknotes, and segmenting each image in a like manner into a plurality of segments. Each segment is classified using a one-class classifier to determine a reference classification parameter. These parameters are used to define a threshold reference classification parameter. Validation of test documents is thus performed by comparing images of the test documents with the generated template rather than by looking at the intrinsic features of the test documents.

There is therefore a need for a simpler and more efficient approach, especially one that does not as such make use of new design and/or production processes, but rather tries to exploit the intrinsic features of security features that are already typically present on most genuine banknotes, especially the characteristic and intrinsic features of intaglio-printed patterns.

SUMMARY OF THE INVENTION

A general aim of the invention is therefore to improve the known methods for checking the authenticity of security documents, in particular banknotes.

More precisely, a further aim of the invention is to provide a method that exploits the intrinsic features of the security features that are already typically printed, applied or otherwise provided on the security documents, especially the intrinsic features of intaglio-printed patterns.

A further aim of the present invention is to provide a solution that enables a robust and efficient differentiation between authentic (genuine) security documents and copies or counterfeits thereof.

Still another aim of the present invention is to provide a solution that can be implemented in automatic document processing systems (such as vending machines, ATMs, etc.) in a more simple manner than the currently known solutions.

These aims are achieved thanks to the solution defined in the claims.

According to the invention, there is provided a method for checking the authenticity of security documents, in particular banknotes, wherein authentic security documents comprise security features printed, applied or otherwise provided on the security documents, which security features comprise characteristic visual features intrinsic to the processes used for producing the security documents, the method comprising the steps of:

acquiring a sample image of at least one region of interest of the surface of a candidate document to be authenticated, which region of interest encompasses at least part of the security features;

digitally processing the sample image by performing a decomposition of the sample image into at least one scale sub-space containing high resolution details of the sample image and extracting classifying features from this scale sub-space; and deriving an authenticity rating of the candidate document based on the extracted classifying features.

Preferably, the digital processing of the sample image includes (i) performing a transform of the sample image to derive at least one set of spectral coefficients representative of the high resolution details of the sample image at a fine scale, and (ii) processing the spectral coefficients to extract the classifying features.

Even more preferably, the transform is a wavelet-transform, advantageously a discrete wavelet transform (DWT) selected from the group comprising for instance Haar-wavelet transform, Daubechies-wavelet transform, and Pascal-wavelet transform. Any other suitable wavelet transform or derivative thereof could be used.

The processing of the spectral coefficients (referred to as "wavelet coefficients" in the context of wavelet transforms) preferably includes performing a processing of the statistical distribution of the spectral coefficients. This statistical processing can in particular include the computing of at least one statistical parameter selected from the group comprising the arithmetic mean (first moment in statistics), the variance (second moment in statistics), the skewness (third moment in statistics), the excess (fourth moment in statistics), and the entropy of the statistical distribution of said spectral coefficients.

The decomposition of the sample image is advantageously performed as a result of one or more iterations of a multiresolution analysis (MRA) of the sample image.

According to the invention, there is also provided a method for checking the authenticity of security documents, in particular banknotes, wherein authentic security documents comprise security features printed, applied or otherwise provided on the security documents, which security features comprise characteristic visual features intrinsic to the processes used for producing the security documents, the method comprising the step of digitally processing a sample image of at least one region of interest of the surface of a candidate document to be authenticated, which digital processing includes performing one or more iterations of a multiresolution analysis of the sample image.

The above methods may provide for the digital processing of a plurality of sample images corresponding to several regions of interest of the same candidate document.

According to a preferred embodiment of the invention, the sample image can be acquired at a relatively low-resolution, i.e. lower than 600 dpi, preferably of 300 dpi. Tests have indeed shown that a high scanning resolution for the sample image is not at all necessary. This is particularly advantageous in that the low resolution shortens the time necessary for performing the acquisition of the sample image and reduces the amount of data to be processed for a given surface area, which accordingly substantially facilitates a practical implementation of the method.

Within the scope of the present invention, the security features that are exploited for the purpose of authentication preferably mainly include intaglio patterns. Nevertheless, the security features may include intaglio patterns, line offset patterns, letterpress patterns, optically-diffractive structures (i.e. patterns or structures that are intrinsic to the processes carried out by the security printer) and/or combinations thereof.

Maximization of the authentication rating is achieved by ensuring that the selected region of interest includes a high density (high spatial frequency) of patterns (preferably linear or curvilinear intaglio-printed patterns). The patterns can in particular be patterns of a pictorial representation, such as a portrait, provided on the candidate document.

There is also claimed a digital signal processing unit for processing image data of a sample image of at least one region of interest of the surface of a candidate document to be authenticated according to the above method, the digital signal processing unit being programmed for performing the digital processing of the sample image, which digital signal processing unit can advantageously be implemented in an FPGA (Field-Programmable-Gate-Array) unit.

There is similarly claimed a device for checking the authenticity of security documents, in particular banknotes, according to the above method, comprising an optical system for acquiring the sample image and a digital signal processing unit programmed for performing the digital processing of the sample image.

There is further claimed a method for producing security documents, in particular banknotes, comprising the step of designing security features to be printed, applied, or otherwise provided on the security documents, wherein the security features are designed in such a way as to optimise an authenticity rating computed according to the above method by producing a characteristic response in the said at least one scale sub-space.

The use of wavelet transform and multiresolution analysis for the authentication of security documents, in particular banknotes, is also claimed.

Lastly, there is provided a method for detecting security features printed, applied or otherwise provided on security documents, in particular banknotes, which security features comprise characteristic visual features intrinsic to the processes used for producing the security documents, the method comprising the step of digitally processing a sample image of at least one region of interest of the surface of a candidate document, which region of interest is selected to include at least a portion of said security features, which digital processing includes performing one or more iterations of a multiresolution analysis of the sample image to extract classifying features which are characteristic of said security features. This method is in particular advantageously applied for detecting intaglio-printed patterns.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

The present invention stems from the observation that security features printed, applied or otherwise provided on security documents using the specific production processes that are only available to the security printer, in particular intaglio-printed features, exhibit highly characteristic visual features (hereinafter referred to as "intrinsic features") that are recognizable by a qualified person having knowledge about the specific production processes involved.

The following discussion will focus on the analysis of intrinsic features produced by intaglio printing. It shall however be appreciated that the same approach is applicable to other intrinsic features of banknotes, in particular line offset-printed features, letterpress-printed features and/or optically-diffractive structures. The results of the tests which have been carried out by the Applicant have shown that intaglio-printed features are very well suited for the purpose of authentication according to the invention and furthermore give the best results. This is especially due to the fact that intaglio printing enables the printing of very fine, high resolution and sharply-defined patterns. Intaglio printing is therefore a preferred process for producing the intrinsic features that are exploited in the context of the present invention.

Figure 1A:
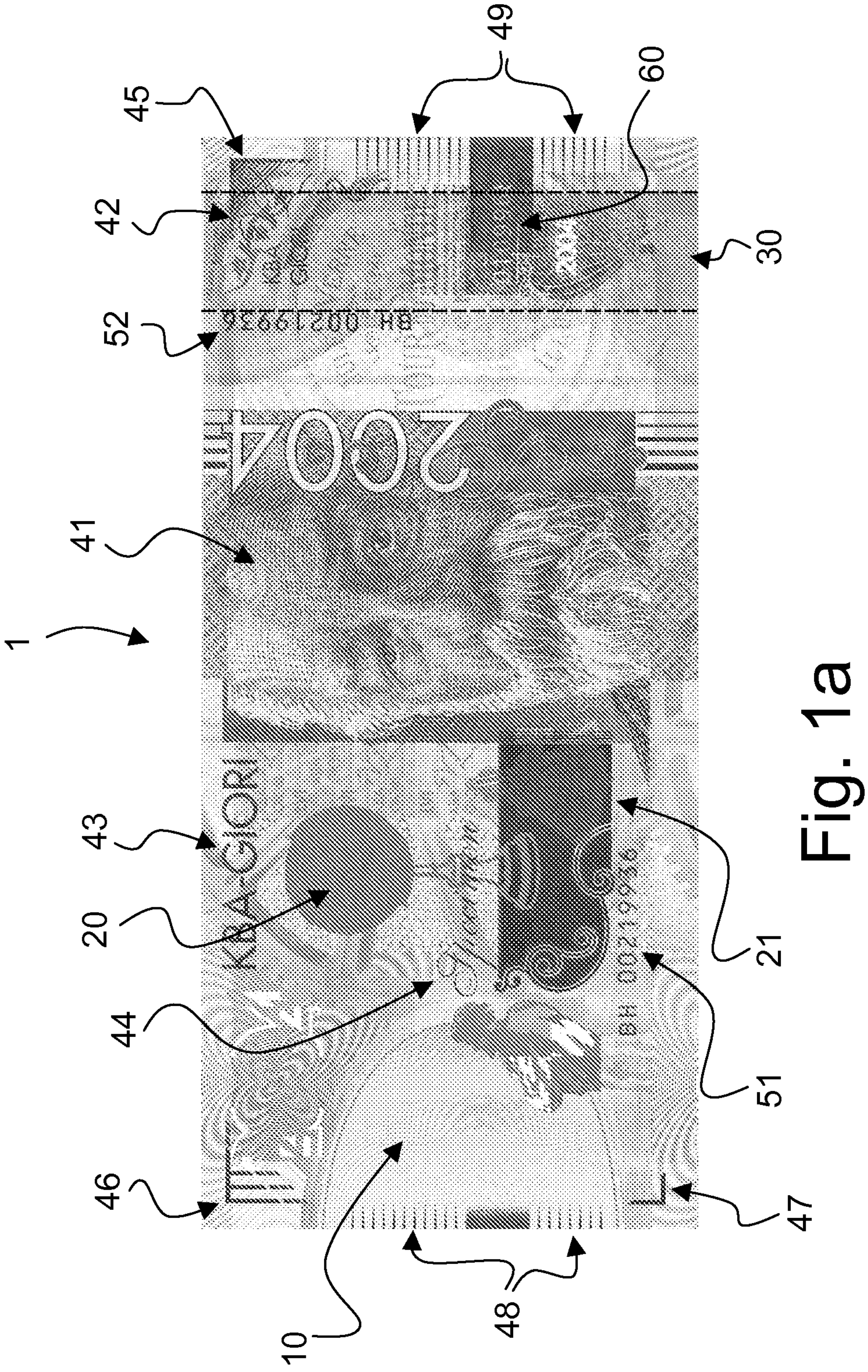
FIG. 1*a* is a greyscale scan of an exemplary banknote specimen.

FIG. 1*a* is a greyscale scan of an illustrative banknote specimen 1 showing the portrait of Jules Verne which was produced during the year 2004 by the present Applicant. This banknote specimen 1 was produced using a combination of printing and processing techniques specific to banknote production, including in particular line offset printing for printing the multicolour background 10 of the note, silk-screen printing for printing optically-variable ink patterns, including motifs of a planisphere 20 and of a sextant 21, foil stamping techniques for applying optically-variables devices, including a strip of material 30 carrying optically-diffractive structures extending vertically along the height of the banknote (which strip 30 is schematically delimited by two dashed lines in FIG. 1*a*), intaglio printing for printing several intaglio patterns 41 to 49, including the portrait 41 of Jules Verne, letterpress printing for printing two serial numbers 51, 52, and varnishing for varnishing the note with a layer of protective varnish. This banknote specimen 1 is also provided with a marking 60 on the right-hand side of the specimen, which marking 60 is applied by partial laser ablation of the strip 30 and of an underlying layer of offset-printed ink (not referenced). In the illustrated example, the portrait 41 (together with the vertical year designation 2004 and the pictorial motifs surrounding the portrait), a logo of "KBA-GIORI" with the Pegasus 42, indications "KBA-GIORI" 43 and "Specimen" 44, and tactile patterns 45 to 49 on three corners of the note and on the right-hand side and left-hand side of the note were printed by intaglio printing on top of the line offset background 10, the silk-screen-printed motifs 20, 21 and the strip of material 30. The serial numbers 51, 52 were printed and the varnishing was performed following the intaglio printing phase. It shall further be understood that the banknote specimen 1 was produced on sheet-fed printing and processing equipment (as supplied by the present Applicant), each printed sheet carrying an array of multiple banknote specimens (as is usual in the art) that were ultimately cut into individual notes at the end of the production process.

Figure 1B:
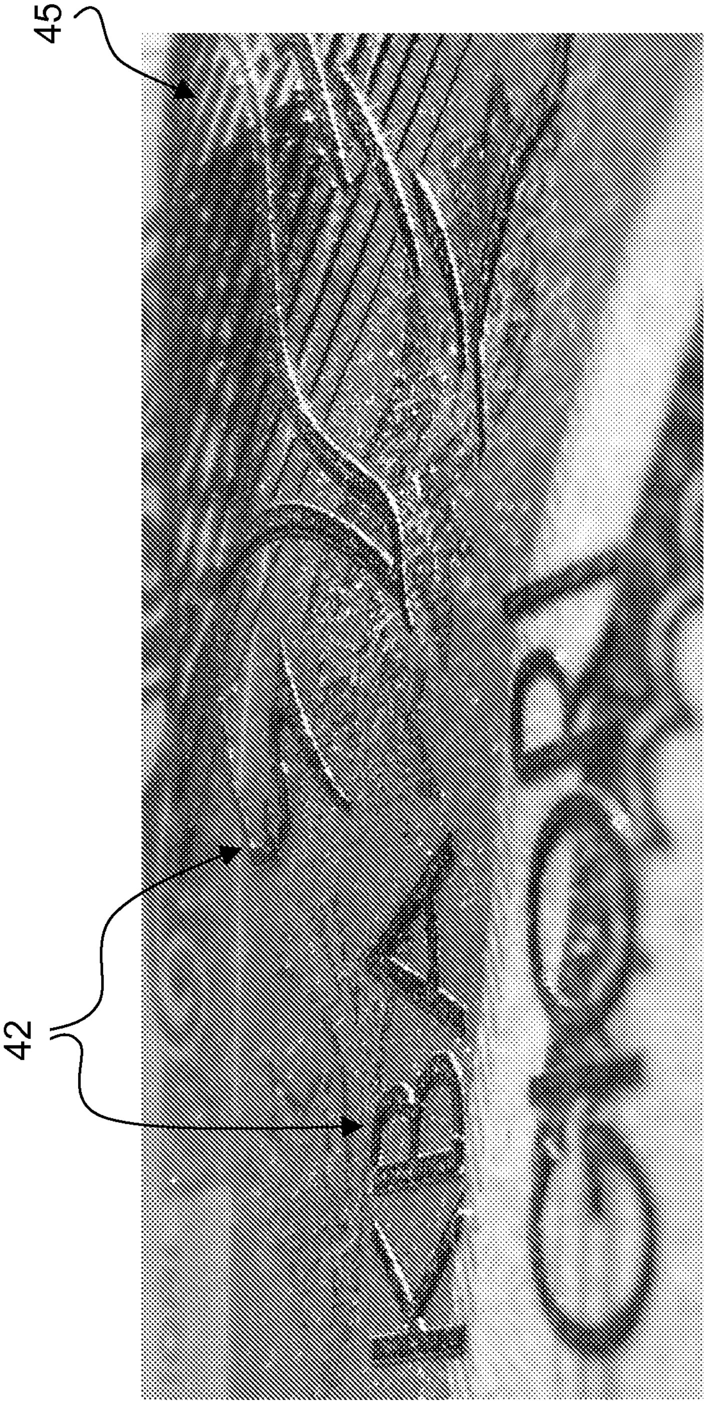
FIG. 1*b* is a greyscale photograph of part of the upper right corner of the banknote specimen of FIG. 1*a;*

FIG. 1*b* is a greyscale photograph of the upper right corner of the banknote specimen of FIG. 1*a* showing in greater detail the intaglio-printed logo of "KBA-GIORI" with the Pegasus 42 and tactile pattern 45 which comprises a set of parallel lines at forty-five degrees partly overlapping with the Pegasus 42. The characteristic embossing and relief effect of the intaglio printing as well as the sharpness of the print can clearly be seen in this photograph.

Figure 2A:
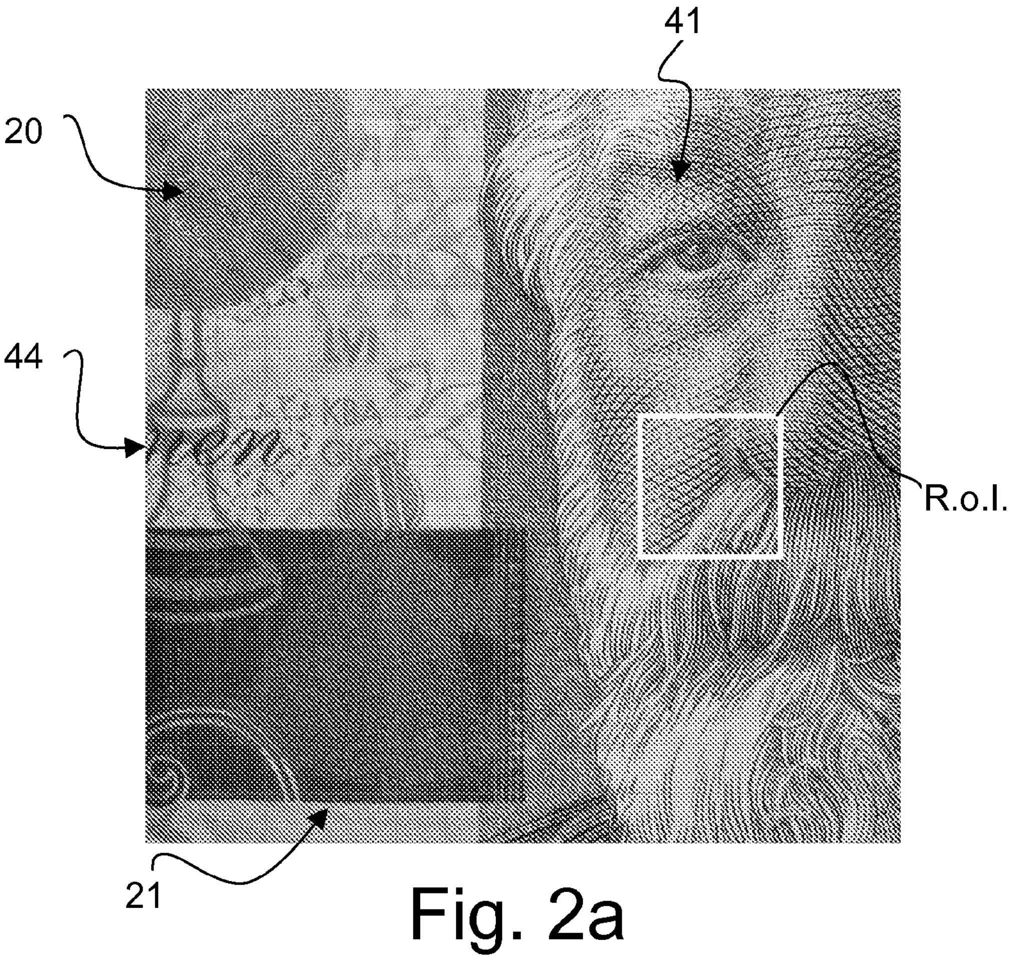
FIGS. 2*a* and 2*b* are enlarged views of the banknote specimen of FIG. 1*a*, FIG. 2*b* corresponding to the area indicated by a white square in FIG. 2*a;*
Figure 2B:
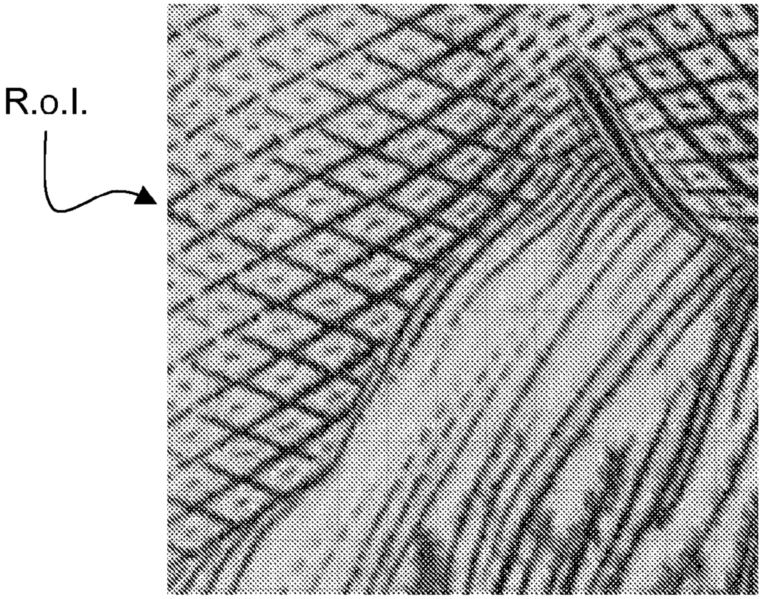

FIG. 2*a* is a more detailed view of a left-hand side portion of the portrait 41 of FIG. 1*a* (patterns 20, 21 and 44 being also partly visible in FIG. 2*a*). FIG. 2*b* is an enlarged view of a square portion (or region of interest R.o.I.) of the portrait 41, which square portion is illustrated by a white square in FIG. 2*a*. FIG. 2*b* shows some of the characteristic intrinsic features of the intaglio patterns constituting the portrait 41. The region of interest R.o.I. used for subsequent signal processing does not need to cover a large surface area of the document. Rather, tests have shown that a surface area of less than 5 $cm^2$ is already sufficient for the purpose of the authentication.

FIGS. 3*a*, 3*b* and 4*a*, 4*b* are greyscale images similar to FIGS. 2*a*, 2*b* of two colour copies of the banknote specimen shown in FIG. 1*a*, which copies were produced using commercial colour copying equipment. In each of FIGS. 3*a* and 4*a*, the depicted white square indicates the corresponding region of interest R.o.I. of the portrait which is shown in enlarged view in FIGS. 3*b* and 4*b*, respectively. The first colour copy illustrated in FIGS. 3*a*, 3*b* was produced using an Epson ink-jet printer and Epson photo-paper. The second colour copy illustrated in FIGS. 4*a*, 4*b* was produced using a Canon ink-jet printer and normal paper. A high-resolution scanner was used to scan the original specimen and provide the necessary input for the ink-jet printers.

Figure 3A:
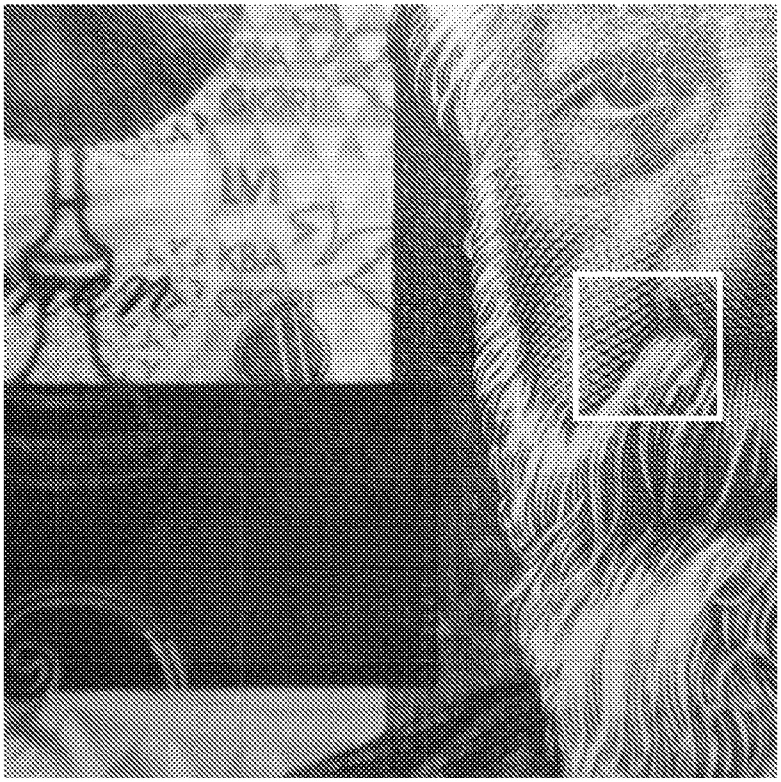
FIGS. 3*a* and 3*b* are enlarged views of a first colour copy of the banknote specimen of FIG. 1*a*, FIG. 3*b* corresponding to the area indicated by a white square in FIG. 3*a;*
Figure 3B:
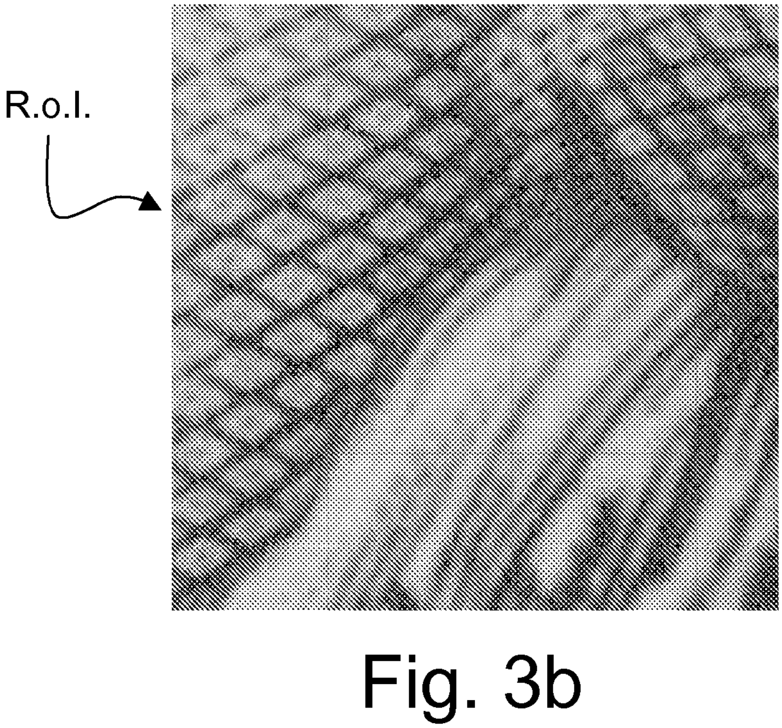
Figure 4A:
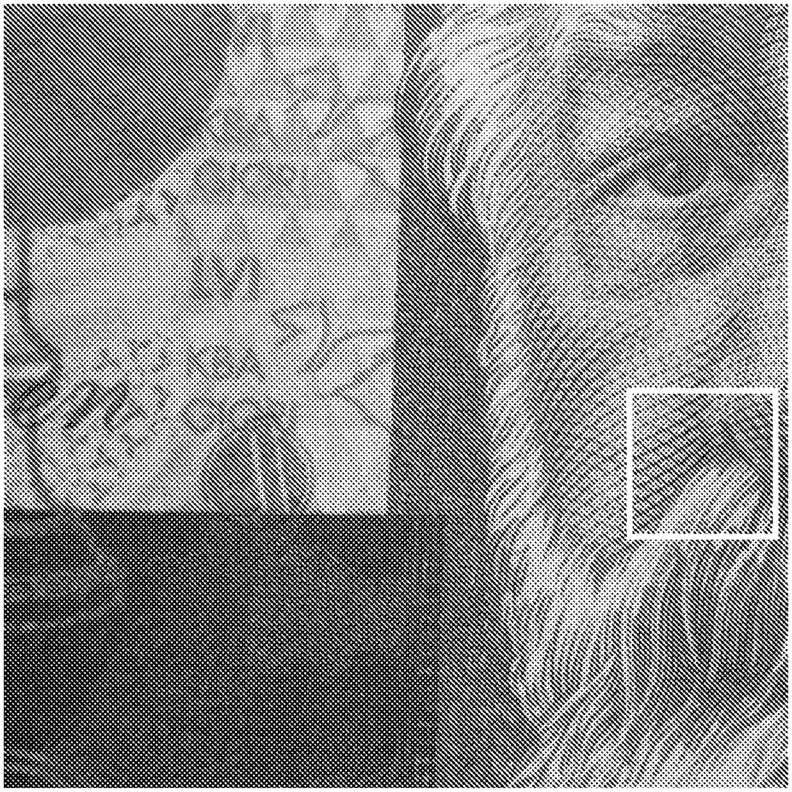
FIGS. 4*a* and 4*b* are enlarged views of a second colour copy of the banknote specimen of FIG. 1*a*, FIG. 4*b* corresponding to the area indicated by a white square in FIG. 4*a;*
Figure 4B:
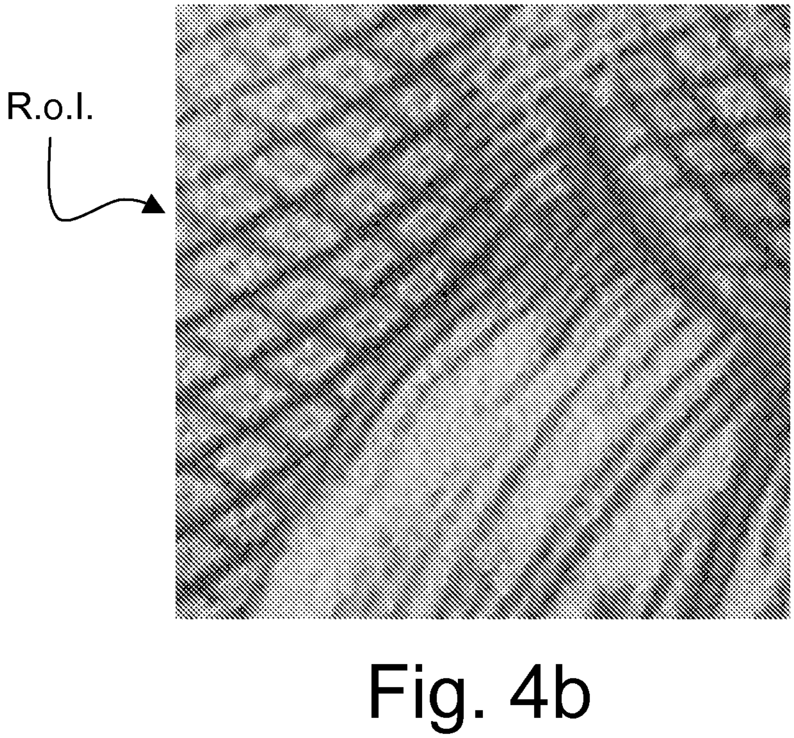

While the general visual aspect of both colour copies looks similar to the original specimen, a closer look at the structures of the copied intaglio pattern forming the portrait, as illustrated in FIGS. 3*b* and 4*b*, shows that the structures are not as sharply defined as in the original specimen (see FIG. 2*b*) and that these structures appear to be somewhat blurred and smoothed as a result of the ink-jet printing process and the nature of the paper used. The image information contained in FIGS. 3*b* and 4*b* is clearly different from that of the original specimen illustrated in FIG. 2*b*. The present invention accordingly concerns a method defining how this difference can be brought forward and exploited in order to differentiate between the original and authentic specimen of FIGS. 2*a*, 2*b* and the copies of FIGS. 3*a*, 3*b* and 4*a*, 4*b*. The below discussion will address this issue.

As hinted above, an intrinsic and characteristic feature of intaglio-printed patterns is in particular the high sharpness of the print, whereas the ink-jet-printed copies exhibit a substantially lower sharpness of print due in particular to the digital processing and printing. The same can be said of colour-laser-printed copies, as well as of copies obtained by thermo-sublimation processes. This difference can be brought forward by performing a decomposition of the image data contained in an enlarged view (or region of interest) of the candidate document to be authenticated, such as the views of FIGS. 2*b*, 3*b* and 4*b*, into at least one scale sub-space containing high resolution details of the image, and extracting representative classifying data from this scale sub-space as this will be explained in greater detail hereinafter.

Preferably, the decomposition of the image is carried out by performing digital signal processing techniques based on so-called wavelets ("ondelettes" in French). A wavelet is a mathematical function used to divide a given function or signal into different scale components. A wavelet transformation (or wavelet transform) is the representation of the function or signal by wavelets. Wavelet transforms have advantages over traditional Fourier transforms for representing functions and signals that have discontinuities and sharp peaks. According to the present invention, one in particular exploits the properties of so-called discrete wavelet transforms (DWTs) as this will be discussed in the following.

It shall be appreciated that Fourier transformation (as for instance used in the context of the solutions discussed in European patent application EP 1 864 825 A1 and U.S. Pat. No. 5,884,296) is not to be assimilated to wavelet transformation. Indeed, Fourier transformation merely involves the transformation of the processed image into a spectrum indicative of the relevant spatial frequency content of the image, without any distinction as regards scale.

Wavelet theory will not be discussed in-depth in the present description as this theory is as such well-known in the art and is extensively discussed and described in several textbooks on the subject. The interested reader may for instance refer to the following books and papers about wavelet theory:

[Mal89] Stéphane G. Mallat, "A Theory for Multiresolution Signal Decomposition: The Wavelet Representation", IEEE Transactions on Pattern Analysis and Machine Intelligence, Vol. 11, No. 7 (Jul. 7, 1989), pp. 674-693;

[Dau92] Ingrid Daubechies, "Ten Lectures on Wavelets", CBMS-NSF Regional Conference Series in Applied Mathematics 61, SIAM (Society for Industrial and Applied Mathematics), 2$^{nd}$ edition, 1992, ISBN 0-89871-274-2;

[Bur98] Sidney C. Burrus, Ramesh A. Gopinath and Haitao Guo, "Introduction to Wavelets and Wavelet Transforms: A Primer", Prentice-Hall, Inc., 1998, ISBN 0-13-489600-9;

[Hub98] Barbara Burke Hubbard, "The World According to Wavelets: The Story of a Mathematical Technique in the Making", A K Peters, Ltd., 2$^{nd}$ edition, 1998, ISBN 1-56881-072-5;

[Mal99] MALLAT, Stéphane, "A wavelet tour of signal processing", Academic Press, 2$^{nd}$ edition, 1999, ISBN 0-12-466606-X; and

[Wal04] WALNUT, David F. "An Introduction to Wavelet Analysis", Birkhäuser Boston, $2^{nd}$ edition, 2004, ISBN 0-8176-3962-4.

Figure 5A:
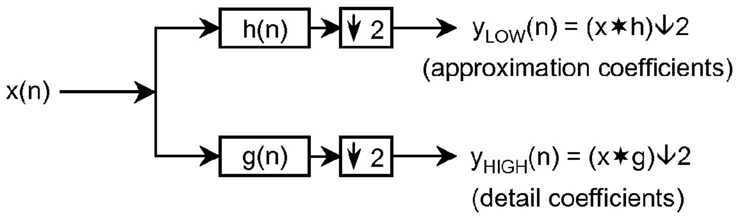
FIG. 5*a* is a schematic diagram of a one-level (one iteration) discrete wavelet transform.

It suffice to understand that a wavelet can conveniently be expressed by a wavelet function (or "mother wavelet") ψ and a scaling function (or "father wavelet") ϕ. The wavelet function ψ can in effect be expressed as a band-pass/high-pass filter which filters an upper half of the signal scale/spectrum, while the scaling function ϕ can be expressed as a low-pass filter which filters the remaining lower half of the signal scale/spectrum. This principle is schematically illustrated in FIG. 5*a* as a one-level digital filter bank comprising a low-pass filter with function h(n) and a high-pass filter with function g(n) which split the signal scale/spectrum in two parts of equal spectral range. We can consider a one-level wavelet transform of a discrete sample signal x(n) as passing this sample signal x(n) through the filter bank of FIG. 5*a*. The output $y_{LOW}(n)$ of the low-pass filter, which basically is the result of the convolution * of signal x(n) and function h(n), comprises the scaling function transform coefficients, or simply "scaling coefficients" (also referred to as the approximation coefficients), while the output $y_{HIGH}(n)$ of the high-pass filter, which is similarly the result of the convolution * of signal x(n) and function g(n), comprises the wavelet function transform coefficients, or simply "wavelet coefficients" (also referred to as the detail coefficients).

As each filter filters half the spectral components of signal x(n), half of the filtered samples can be discarded according to Nyquist's rule. In FIG. 2, the outputs of the low-pass and high pass filters are therefore downsampled by two (hence the downsampling operator "↓2" following each filter in FIG. 5*a*), meaning that every two sample is discarded.

Figure 5B:
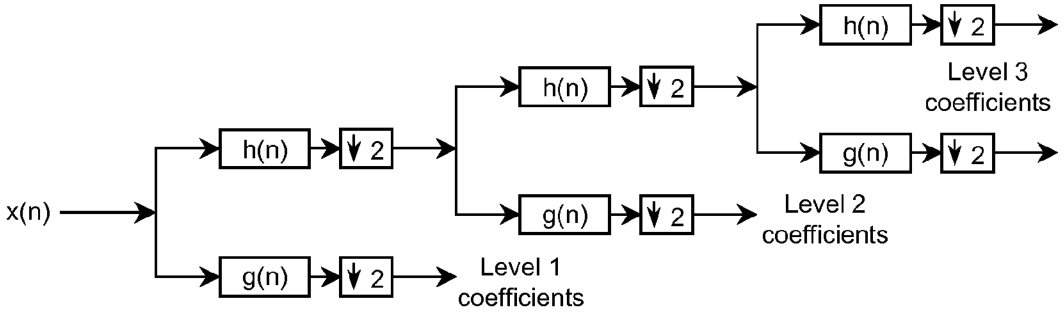
FIG. 5*b* is a schematic diagram of a three-level (three iterations) discrete wavelet transform.

Following this approach, a signal can be decomposed into a plurality of wavelet coefficients corresponding to different scales (or resolutions) by iteratively repeating the process, i.e. by passing the approximation coefficients outputted by the low-pass filter to a subsequent similar filter stage. This approach is known as a multiresolution analysis or MRA (see [Mal89]) and is schematically illustrated in FIG. 5*b* in the case of a three-level multiresolution analysis. As this can be appreciated in FIG. 5*b*, the filter bank is in effect a three-level filter bank wherein the low-pass filtered output of a preceding filter stage is again filtered by the subsequent filter stage.

In FIG. 5*b*, the signal x(n) is in effect decomposed in four signal components corresponding to three distinct scales, namely (i) detail coefficients at a first scale (the level 1 coefficients) which comprise half the number of samples as compared to signal x(n), (ii) detail coefficients at a second scale different from the first (the level 2 coefficients) which comprise ¼ of the number of samples as compared to signal x(n), and (iii) approximation coefficients and (iv) detail coefficients at a third scale (the level 3 coefficients) which each comprise ⅛ of the number of samples as compared to signal x(n).

As a matter of fact, a discrete sample signal can eventually be completely decomposed in a set of detail coefficients (wavelet coefficients) at different scales as long as the sample signal includes $2^N$ samples, where N would be the number of iterations or levels required to completely decompose the signals into wavelet coefficients.

Figure 6:
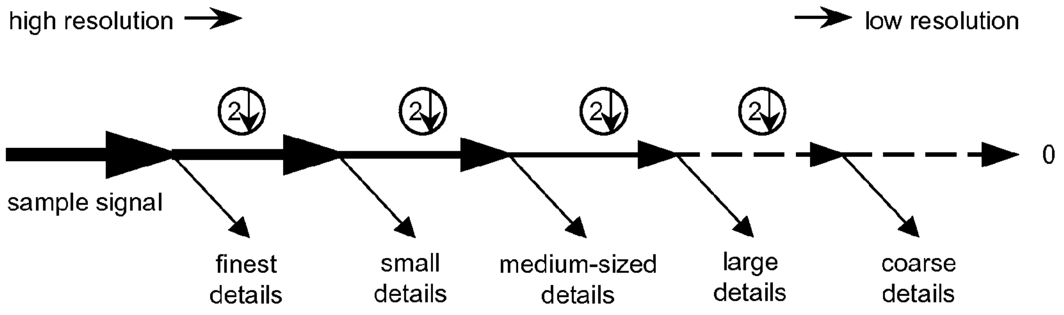
FIG. 6 is a schematic diagram illustrating the principle of multiresolution analysis (MRA)

In summary, multiresolution analysis (MRA), or multi-scale analysis, refers to a signal processing technique based on wavelet transforms, whereby a signal is decomposed in a plurality of nested subspaces of different scales ranging from fine details (high resolution components) to coarse details (low resolution components) of the signal as schematically illustrated by the diagram of FIG. 6.

According to the present invention, the intrinsic features of genuine security features, especially the intrinsic feature of intaglio patterns, will be identified by looking especially at the fine high resolution (fine scale) details of an image of the candidate document to be authenticated, rather than at the coarser low resolution details of the image of the candidate document.

Up to now, one has discussed the wavelet theory in the context of the processing of one-dimensional signal only. Images are however to be regarded as two-dimensional signals which accordingly require a two-dimensional processing. One will accordingly briefly discuss the concept of two-dimensional wavelet transform before turning to the actual description of preferred embodiments of the invention.

The above-discussed wavelet theory can easily be extended to the decomposition of two-dimensional signals as for instance discussed in [Mal89]. Two-dimensional wavelet transform basically involves a row-wise and column-wise processing of the two-dimensional signal wherein the rows and columns of the signal are processed separately using the above-discussed one-dimensional wavelet algorithm. This will be explained in reference to FIGS. 7*a*, 7*b*, 8 and 9.

Figure 7A:
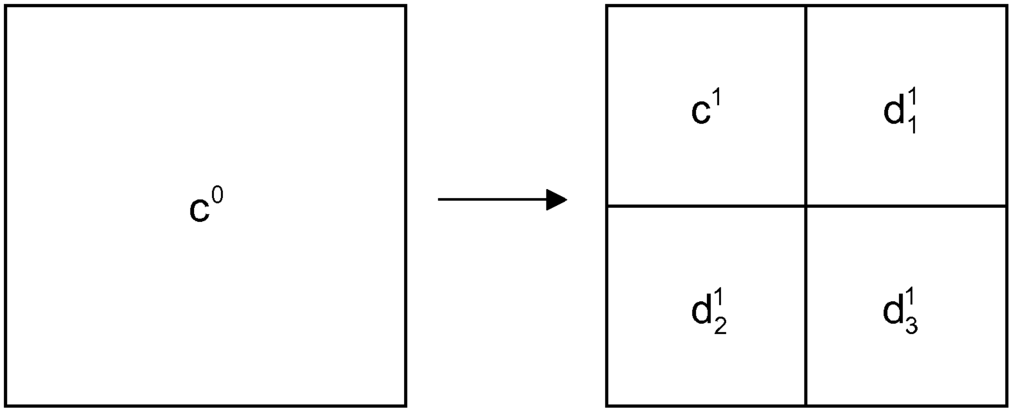
FIG. 7*a* illustrates a first iteration of a two-dimensional wavelet transform.

In FIG. 7*a*, there is schematically illustrated an original image (i.e. an image corresponding to a selected region of interest of a sample image of a candidate document to be authenticated—such as for instance the image of FIG. 2*b*, 3*b* or 4*b*), which original image is designated as $c^0$. This original image $c^0$ consists of a matrix of n×n pixels, where n is dividable by $2^N$, N being an integer corresponding to the number N of wavelet iterations one wishes to perform. In practice, the image size should be sufficiently big so as to encompass a relatively high number of features. For the sake of illustration, the original image $c^0$ may for instance consist of a matrix of 256×256 pixels. Other images sizes are however perfectly possible. At a sampling resolution of 300 dpi, it will be appreciated that such an image size corresponds to a surface area on the candidate document to be authenticated of approximately 2×2 $cm^2$.

As a result of the first iteration of the wavelet transform, as illustrated in FIG. 7*a*, the original image $c^0$ is decomposed in four sub-images $c^1$, $d_1^1$, $d_2^1$ and $d_3^1$ each having a size of (n/2)×(n/2) pixels. Sub-image $c^1$ contains the approximation of the original image $c^0$ resulting from low-pass filtering along both the rows and columns of the original image $c^0$. On the other hand, sub-images $d_1^1$, $d_2^1$ and $d_3^1$ contain the details of the original image $c^0$ resulting from high-pass filtering along the rows and/or columns of the original image $c^0$. More precisely:

- $d_1^1$ is the result of high-pass filtering along the rows and low-pass filtering along the columns of the original image $c^0$ and contains horizontal details of the original image $c^0$;
- $d_2^1$ is the result of low-pass filtering along the rows and high-pass filtering along the columns of the original image $c^0$ and contains vertical details of the original image $c^0$; and
- $d_3^1$ is the result of high-pass filtering along both the rows and columns of the original image $c^0$ and contains diagonal details of the original image $c^0$.

Figure 7B:
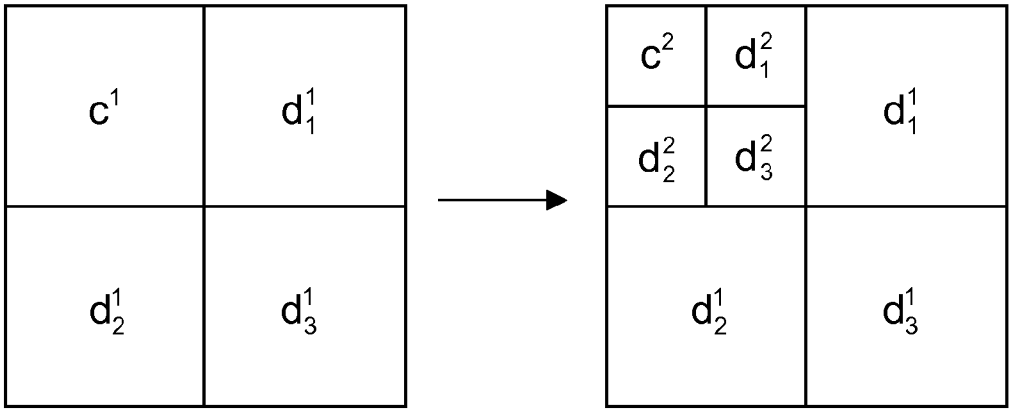
FIG. 7*b* illustrates a second iteration of the two-dimensional wavelet transform following the first iteration illustrated in FIG. 7*a;*

The process can be repeated during a subsequent iteration by similarly decomposing sub-image $c^1$ in four additional sub-images $c^2$, $d_1^2$, $d_2^2$ and $d_3^2$ each having a size of (n/4)×(n/4) pixels, as schematically illustrated in FIG. 7*b*. In FIG. 7*b*, sub-images $d_1^1$, $d_2^1$ and $d_3^1$ are representative of details of the image $c^0$ at a first resolution (or scale), while sub-images $d_1^2$, $d_2^2$ and $d_3^2$ are representative of details of the image $c^0$ at a second resolution, half that of the first resolution.

Following N iterations, the original image $c^0$ will thus be decomposed into 3N+1 sub-images $d_1^m$, $d_2^m$, $d_3^m$ and $c^N$, where m=1, 2, . . . , N. As already hinted above, sub-images $d_1^m$ will each contain the horizontal details of the original image at different scales (or resolutions), whereas sub-images $d_2^m$ and $d_3^m$ will each respectively contain the vertical and diagonal details of the original image at different scales.

Figure 8:
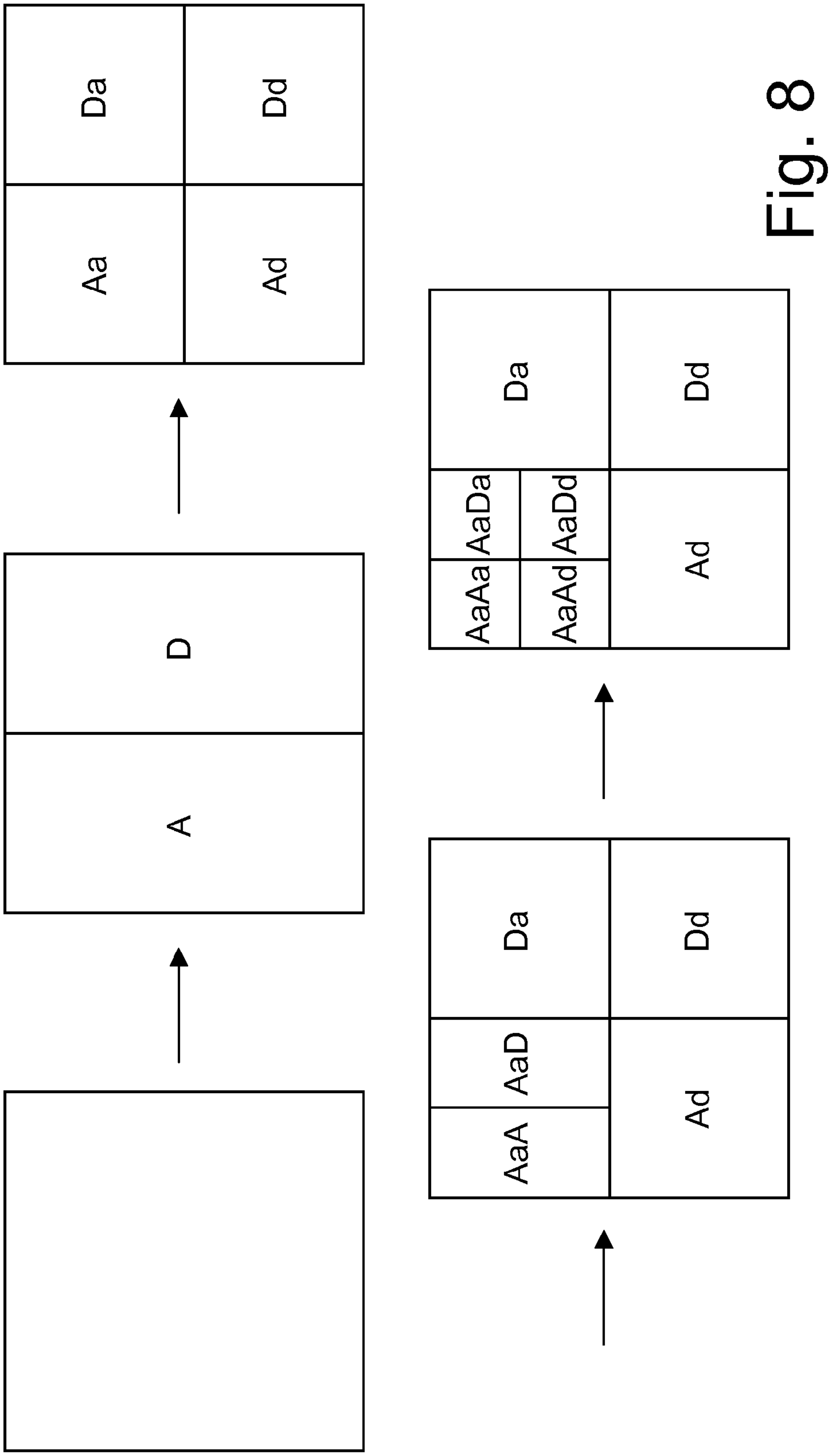
FIG. 8 is a schematic illustration of the so-called "non-standard decomposition" method for performing two-dimensional wavelet transform.

The two-dimensional wavelet transform is preferably carried out according to the so-called "non-standard decomposition" method, which method is schematically illustrated in FIG. 8. According to this decomposition method, one-dimensional wavelet transform is alternately performed on the rows and the columns of the image. In FIG. 8, references A, D, a, d respectively designate:

A: the approximation (i.e. low-pass filtered) coefficients of the rows of the image;

D: the detail (i.e. high-pass filtered) coefficients of the rows of the image;

a: the approximation (i.e. low-pass filtered) coefficients of the columns of the image; and d: the detail (i.e. high-pass filtered) coefficients of the columns of the image.

As illustrated in the upper part of FIG. 8, the rows of the original image are first processed and then the columns, such as to yield to the result illustrated in FIG. 7*a* (where Aa, Da, Ad and Dd respectively correspond to sub-images $c^1$, $d_1^1$, $d_2^1$ and $d_3^1$). As illustrated in the lower part of FIG. 8, sub-image Aa (which corresponds to sub-image $c^1$) is similarly processed starting with the rows and then the columns, resulting in the same decomposition as illustrated in FIG. 7*b* (where AaAa, AaDa, AaAd and AaDd respectively correspond to sub-images $c^2$, $d_1^2$, $d_2^2$ and $d_3^2$).

Figure 9:
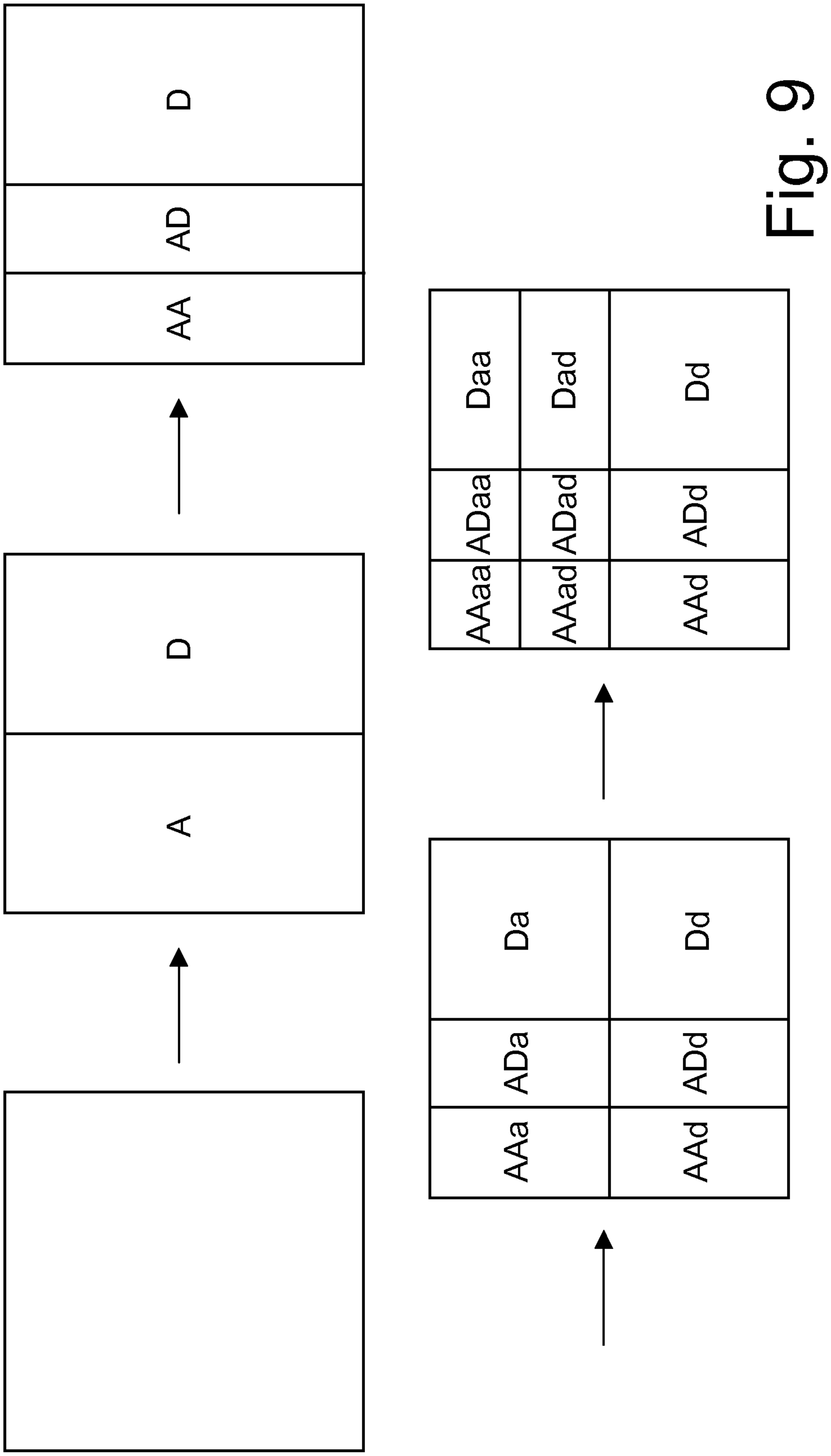
FIG. 9 is a schematic illustration of the so-called "standard decomposition" method for performing two-dimensional wavelet transform.

An alternative to the above-discussed "non-standard decomposition" method is the so-called "standard decomposition" method which is carried out by performing all required iterations along the rows and then only the required iterations along the columns. This method is schematically illustrated in FIG. 9.

An advantage of the "standard decomposition" method resides in the fact that each row and column of the image only needs to be loaded from memory only once in order to transform the whole image. This method accordingly requires a minimal number of memory accesses which is favourable in the context of an FPGA (Field Programmable Gate Array) implementation.

While the "non-standard decomposition" method necessitates more memory accesses in comparison to the other method, it has the advantage that it requires less computation time, since, during each iteration, only a quarter of the data resulting from the preceding iteration has to be processed. Furthermore, the horizontal and vertical details are extracted separately by means of the "non-standard decomposition" method as this can be readily understood from comparing FIGS. 8 and 9.

Different types of discrete wavelet transforms (DWTs) are suitable in the context of the present invention. Successful tests have in particular been carried out by making use of the so-called Haar-, Daubechies- and Pascal-wavelet transforms which are known as such in the art.

The Haar-wavelet transform is actually the first known wavelet transform. This wavelet transform (while not designated as such at the time) was discovered in 1909 by Hungarian mathematician Alfred Haar. This wavelet transform is also known as a special case of the so-called Daubechies-wavelet transform. The corresponding high-pass and low-pass filters of the Haar-wavelet transform each consist of two coefficients, namely:

for the low-pass filter:

$$h_1 = \frac{1}{\sqrt{2}} \tag{1}$$

and $$h_2 = \frac{1}{\sqrt{2}} \tag{2}$$

and for the high-pass filter:

$$g_1 = \frac{1}{\sqrt{2}} \tag{3}$$

and $$g_2 = -\frac{1}{\sqrt{2}} \tag{4}$$

The Daubechies-wavelet transform (see [Dau92]) is named after Ingrid Daubechies, a Belgian physicist and mathematician. The Daubechies-wavelets are a family of orthogonal wavelets and are characterised by a maximal number of so-called vanishing moments (or taps).

Among the family of Daubechies-wavelet transforms, one for instance knows the so-called Daubechies 4 tap wavelet (or db4 transform), where the filter coefficients consists of four coefficients, namely: for the low-pass filter:

$$h_1 = \frac{1+\sqrt{3}}{4} = 0,6830127 \tag{5}$$

$$h_2 = \frac{3+\sqrt{3}}{4} = 1,1830127 \tag{6}$$

$$h_3 = \frac{3-\sqrt{3}}{4} = 0,3169873 \tag{7}$$

and $$h_4 = \frac{1-\sqrt{3}}{4} = -0,1830127 \tag{8}$$

and for the high-pass filter:

$$g_1 = \frac{1-\sqrt{3}}{4} = -0,1830127 \tag{9}$$

$$g_2 = -\frac{3-\sqrt{3}}{4} = -0,3169873 \tag{10}$$

$$g_3 = \frac{3+\sqrt{3}}{4} = 1,1830127 \tag{11}$$

and $$g_4 = -\frac{1+\sqrt{3}}{4} = -0,6830127 \tag{12}$$

An advantage of the Daubechies-db4 transform over the Haar-wavelet transform resides in particular in the increased filtering efficiency of the Daubechies transform, i.e. the cut-off frequencies of the low-pass and high-pass filters are more sharply defined.

The Pascal-wavelet transform is based on the binomial coefficients of Pascal's triangle (named after the French philosopher and mathematician Blaise Pascal). Although the Pascal-wavelet transform has less sharply-defined cut-off frequencies than the Haar- and Daubechies wavelet transforms, this transform can better approximate continuous signals than the Haar-wavelet transform and requires less computation time than the Daubechies-wavelet transform.

For the sake of example, the following Pascal-wavelet transform can be used, where the low-pass and high-pass filters are each defined with the following three filter coefficients:

for the low-pass filter:

$$h_1 = \frac{\sqrt{2}}{4} = 0,35355 \tag{13}$$

$$h_2 = \frac{1}{\sqrt{2}} = 0,7071 \tag{14}$$

and $$h_3 = \frac{\sqrt{2}}{4} = 0,35355 \tag{15}$$

and for the high-pass filter:

$$g_1 = \frac{\sqrt{2}}{4} = 0,35355 \tag{16}$$

$$g_2 = -\frac{1}{\sqrt{2}} = -0,7071 \tag{17}$$

and $$g_3 = \frac{\sqrt{2}}{4} = 0,35355 \tag{18}$$

In contrast to the Haar- and Daubechies-wavelet transforms, the Pascal-wavelet transform is a non-orthogonal wavelet.

While the Haar-, Daubechies- and Pascal-wavelet transforms have been mentioned hereinabove as possible discrete wavelet transforms that can be used in the context of the present invention, these shall only be considered as preferred examples. Other discrete wavelet transforms are further known in the art (see for instance [Mal99]).

According to the present invention, one shall again appreciate that one is mainly interested in the fine, high resolution details of the selected region of interest of the sample image of the candidate document. In other words, according to the present invention, the signal (i.e. the image data of the region of interest) does not need to be completely decomposed into wavelet components. Accordingly, it suffice to perform one or more iterations of the wavelet transformation of the image data in order to extract the relevant features that will enable to built representative classifying data about the candidate document to be authenticated, as this will be appreciated from the following. This means that the most relevant scales of the image to be considered are those corresponding to the fine, high resolution details which are first derived in the course of the multiresolution analysis.

Tests carried out by the Applicant have shown that one iteration of the wavelet transform (i.e. a one-level resolution analysis as schematically illustrated by FIG. 5*a*) is sufficient in most cases to extract the necessary features enabling a classification (and thus differentiation) of the candidate document being authenticated into the class of genuine, or presumably genuine, documents or of copied/counterfeited documents. In other words, the sample image may simply be decomposed into at least one fine scale sub-space containing high resolution details of the sample image.

Within the scope of the present invention, it is however perfectly possible to perform more than one iteration of the wavelet transform, i.e. extract multiple sets of detail coefficients (or wavelet coefficients) corresponding to more than one high-resolution scale of the image data. For the sake of computing and processing efficiency, it is preferable to keep the number of iterations as low as possible. Furthermore, as already stated above, a complete decomposition of the signal into wavelet components is not necessary according to the present invention, as the last wavelet components to be derived correspond to the low-resolution, coarse content of the image, which content is expected to be relatively similar between a genuine document and a counterfeit thereof. Indeed, this is part of the explanation as to why an unskilled person having no particular knowledge about security printing can so easily be deceived by the general visual appearance and look of a counterfeited document.

The following discussion will therefore focus on the case of one-level wavelet transformation involving only one iteration of a two-dimensional wavelet transform as schematically illustrated in FIG. 7*a*, i.e. the region of interest will be decomposed into four sub-images $c^1$, $d_1^{\,1}$, $d_2^{\,1}$ and $d_3^{\,1}$.

Figure 10A:
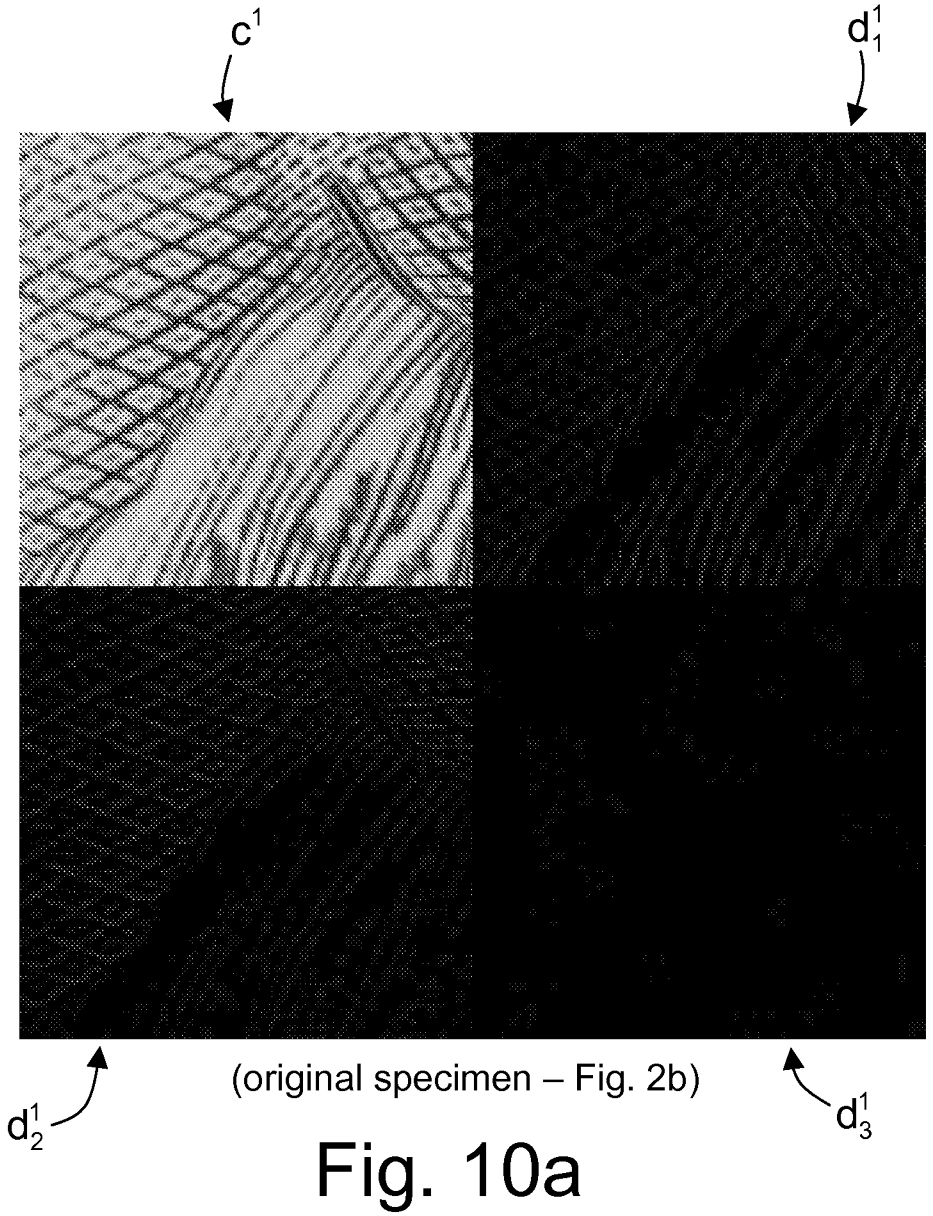
FIG. 10*a* is an illustration of the result of the first iteration of a two-dimensional wavelet transform applied on image data corresponding to the region of interest illustrated in FIG. 2*b;*

FIG. 10*a* illustrates the result of the first iteration of a two-dimensional wavelet transform as applied to the image shown in FIG. 2*b* of an original banknote specimen. In this example, the original image had a size of 252×252 pixels and use was made of the Haar-wavelet transform mentioned above to process the image.

The approximation image $c^1$ resulting from low-pass filtering is shown in the upper left corner of FIG. 10*a*. The detail images $d_1^{\,1}$, $d_2^{\,1}$ and $d_3^{\,1}$ resulting from high-pass filtering are shown as substantially dark regions, due to the fact that the wavelet coefficients have small values and also include negative coefficients (the wavelet coefficients therefore appear as substantially "black" pixels when directly visualized).

Figure 10B:
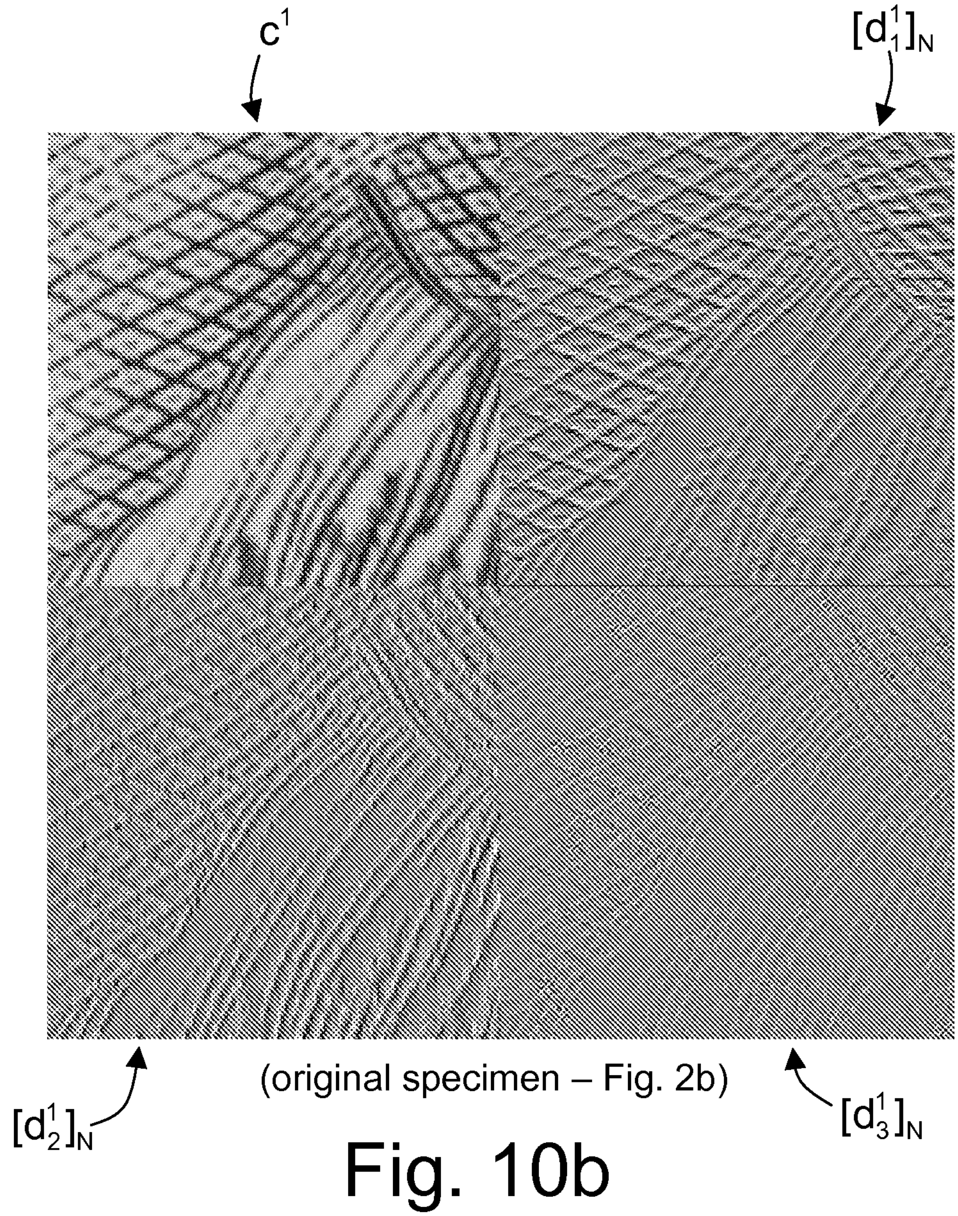
FIG. 10*b* is an illustration of the result of the first iteration of a two-dimensional wavelet transform applied on image data corresponding to the region of interest illustrated in FIG. 2*b* as shown in FIG. 10*a*, wherein the detail sub-images have been normalized for better visual representation.

For a better view of the wavelet coefficients of images $d_1^{\,1}$, $d_2^{\,1}$ and $d_3^{\,1}$, the images can be normalized so that the coefficients are comprised within the range of values 0 to 255 (i.e. the 8-bit value range of a greyscale image). Such a view is illustrated in FIG. 10*b* where $[d_1^{\,1}]_N$, $[d_2^{\,1}]_N$ and $[d_3^{\,1}]_N$ respectively designate normalized versions of detail images $d_1^{\,1}$, $d_2^{\,1}$ and $d_3^{\,1}$. From looking at FIG. 10*b*, one can see that the wavelet-transform adequately detects the sharp transitions of the intaglio patterns.

Figure 11A:
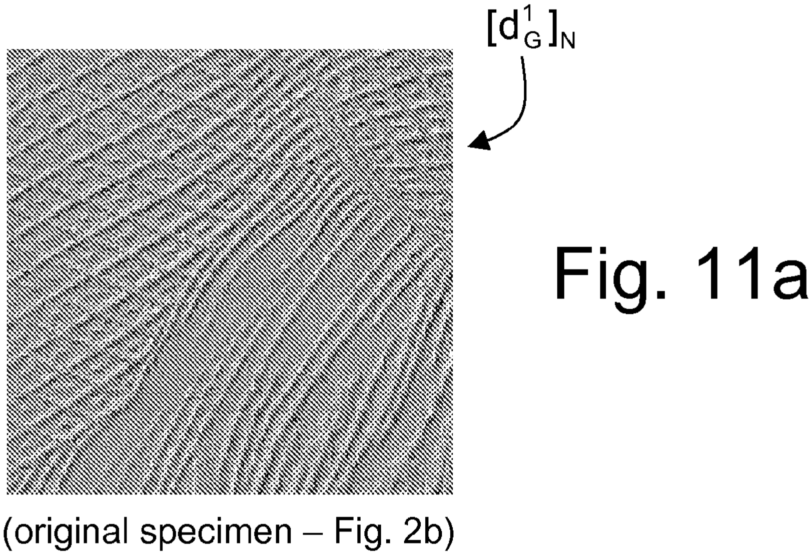
FIGS. 11*a* to 11*c* are three illustrations of the result of a combination of the detail sub-images (as illustrated in FIG. 10*b*), normalized for better visual representation, wherein FIGS. 11*a*, 11*b* and 11*c* respectively show the result of the processing of the images of FIGS. 2*b*, 3*b* and 4*b;*
Figure 11B:
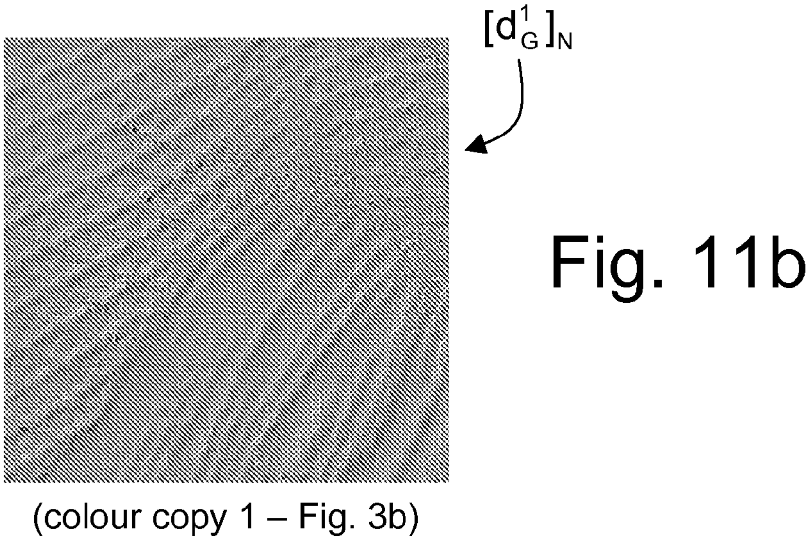
Figure 11C:
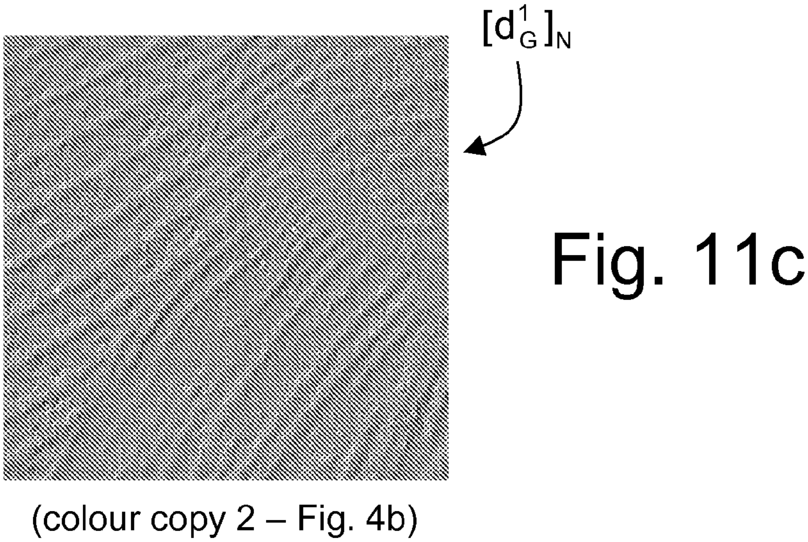

FIG. 11*a* shows a normalized image $[d_G^{\,1}]_N$ resulting from the combination of the three detail images $d_1^{\,1}$, $d_2^{\,1}$ and $d_3^{\,1}$ of FIGS. 10*a*, 10*b*. FIGS. 11*b* and 11*c* illustrate the corresponding normalized image $[d_G^{\,1}]_N$ obtained as a result of the wavelet transform of the images of the first and second colour copies of FIGS. 3*b* and 4*b*, respectively.

One can see that there exists a substantial visual difference between the image of FIG. 11*a* and those of FIGS. 11*b* and 11*c*. One can in particular see that edges of the pattern appear more clearly in FIG. 11*a*, than in FIGS. 11*b* and 11*c*.

Now that images of various candidate documents have been processed, one will explain how representative features can be extracted from these processed images in order to classify and differentiate the documents.

Figure 12:
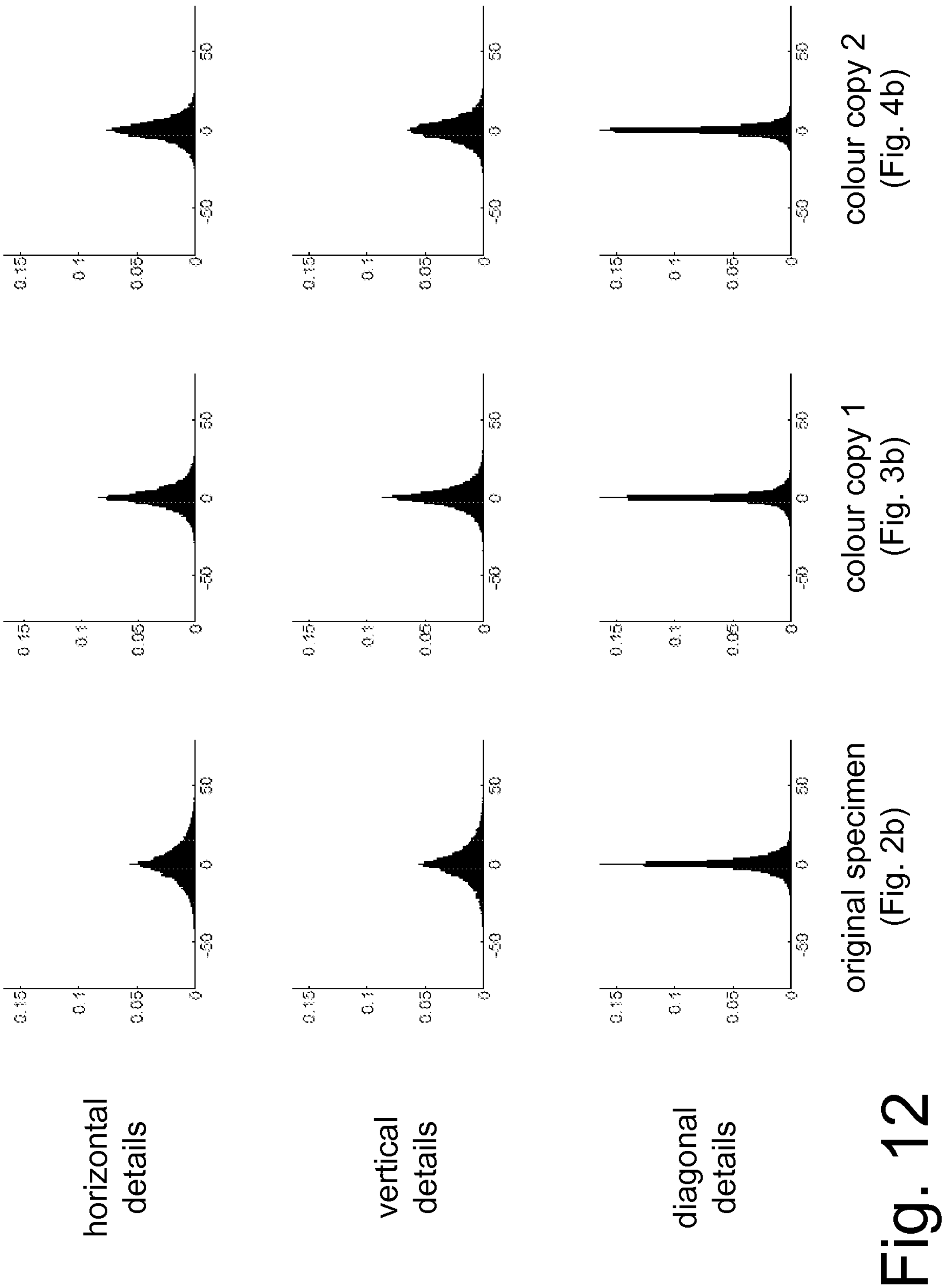
FIG. 12 shows nine histograms illustrating the statistical distribution of the wavelet coefficients resulting from a one level wavelet transform of the images of FIGS. 2*b*, 3*b* and 4*b*, the upper line, middle line and bottom line of three histograms being respectively representative of the horizontal details, the vertical details and the diagonal details resulting from the wavelet transform.

FIG. 12 is an illustration of nine histograms showing the statistical distributions of the wavelet coefficients for the horizontal, vertical and diagonal details (i.e. the wavelet coefficients of detail images $d_1^{\,1}$, $d_2^{\,1}$ and $d_3^{\,1}$) for each one of the images of FIGS. 2*b*, 3*b* and 4*b*. More precisely, the left, middle and right columns of FIG. 12 respectively show the corresponding histograms derived for the images of FIGS. 2*b*, 3*b* and 4*b*, while the upper, middle and bottom rows of FIG. 12 respectively shown the corresponding histograms for the horizontal, vertical and diagonal details.

It may be seen from FIG. 12 that the histograms derived from the image of the original specimen (left column in FIG. 12) are wider than the histograms derived from the images of the colour copies (middle and right columns in FIG. 12). In other words, the variance $\sigma^2$, i.e. the measure of the dispersion of the wavelet coefficients, can conveniently be used to categorize the statistical distribution of the wavelet coefficients. The variance $\sigma^2$ is also referred to in statistics as the "second moment". Alternatively, one may use the so-called standard deviation $\sigma$ which is the square root of the variance $\sigma^2$.

Beside the variance $\sigma^2$ and the standard deviation $\sigma$, further statistical parameters might be used to characterize the statistical distribution of the wavelet coefficients, namely:

- the arithmetic mean of the wavelet coefficients also referred to in statistics as the "first moment";
- the skewness of the statistical distribution of the wavelet coefficients—also referred to in statistics as the "third moment"—which is a measure of the asymmetry of the statistical distribution;
- the excess, or excess kurtosis, (or simply "kurtosis")—also referred to in statistics as the "fourth moment"—which is a measure of the "peakedness" of the statistical distribution; and/or
- the statistical entropy, which is a measure of changes in the statistical distribution.

For the purpose of feature extraction, the above-listed moments (including the variance) shall be normalized to enable proper comparison and classification of the various candidate documents.

Figure 13:
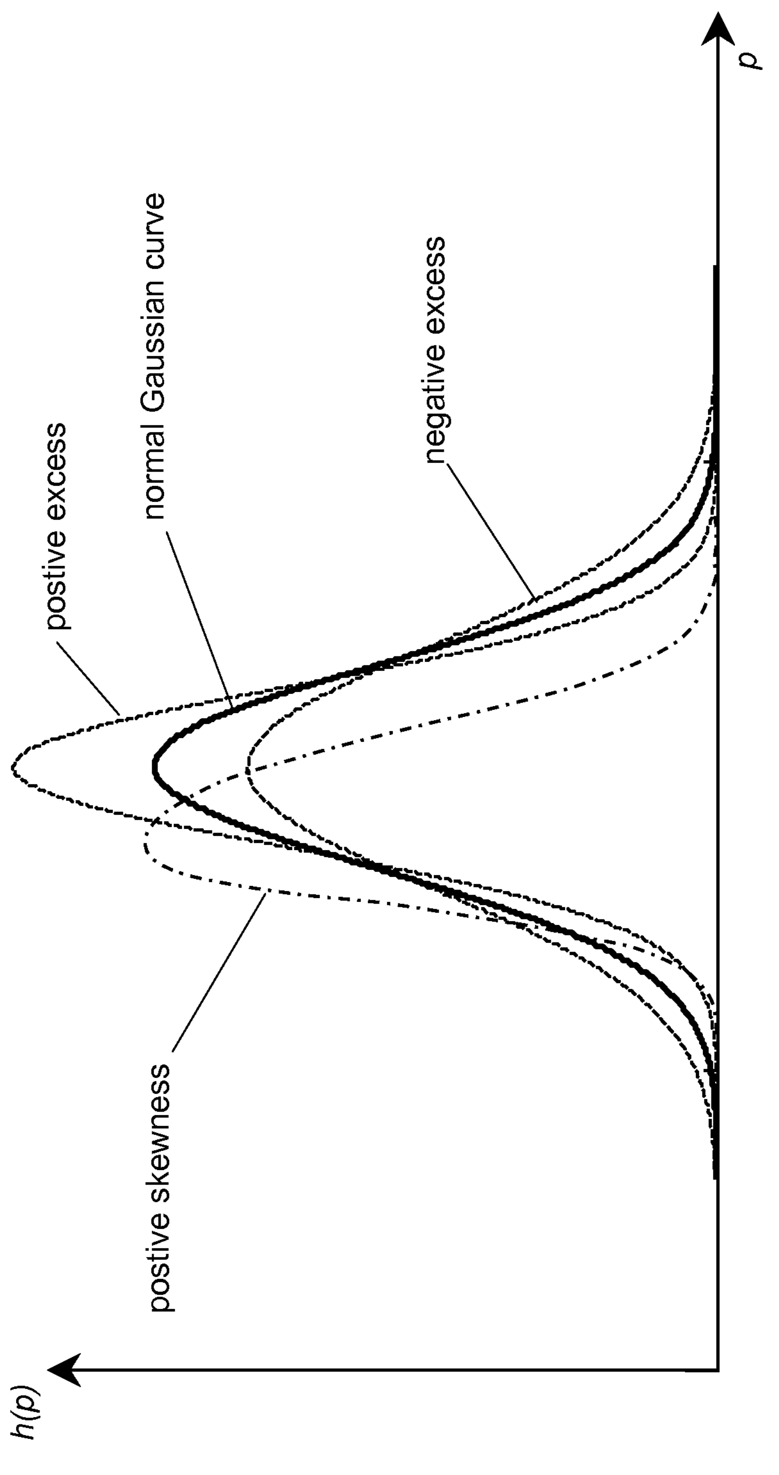
FIG. 13 is a schematic illustration of two statistical parameters, namely skewness (also referred to as the third moment in statistics) and excess kurtosis (also referred to as the fourth moment in statistics) that can be used to characterize the statistical distribution of wavelet coefficients.

FIG. 13 illustrates the notions of skewness and excess. A "positive skewness" (as illustrated) is understood to characterize a statistical distribution wherein the right tail of the distribution is longer and wherein the "mass" of the distribution is concentrated on the left. The converse is a "negative skewness". On the other hand, a "positive/high excess" or "negative/low excess" (as illustrated) is understood to characterize a statistical distribution comprising a sharper peak and fatter tails, respectively a more rounded peak and wider "shoulders".

In the following, one will in particular exploit the excess (hereinafter designated by reference C) as a further categorizing feature, together with the variance $\sigma^2$.

Figure 14A:
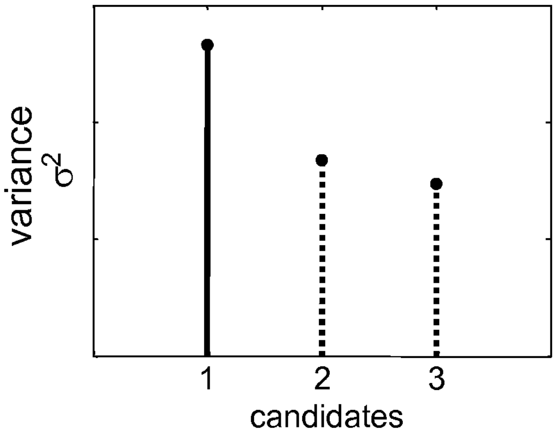
FIGS. 14*a* to 14*c* are three bar charts illustrating the variance, i.e. the measure of the dispersion, of the statistical distribution of the wavelet coefficients derived from the one-level wavelet transform of the images of FIGS. 2*b*, 3*b* and 4*b*, respectively, for horizontal details, vertical details and diagonal details.
Figure 14B:
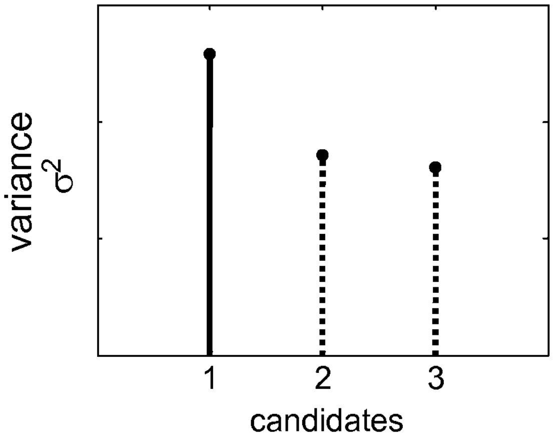
Figure 14C:
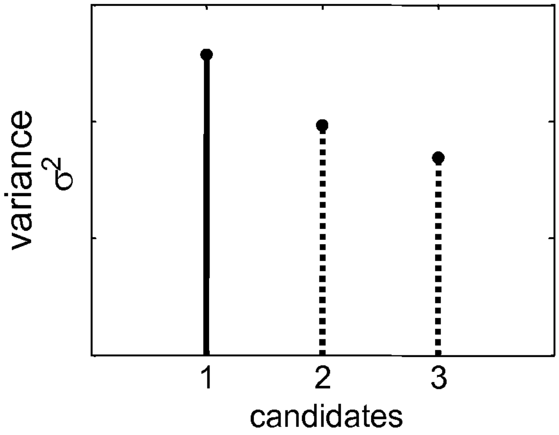

FIGS. 14*a* to 14*c* are three bar charts illustrating the variance $\sigma^2$ of the statistical distributions of the wavelet coefficients illustrated by the diagrams of FIG. 12. Reference numerals 1, 2, 3 in FIGS. 14*a* to 14*c* respectively refer to the three candidate documents that have been processed, namely the original specimen (FIGS. 2*a* and 2*b*), the first colour copy (FIGS. 3*a* and 3*b*) and the second colour copy (FIGS. 4*a* and 4*b*). In FIG. 14*a*, the variance $\sigma^2$ is shown for the horizontal details, while FIGS. 14*b* and 14*c* respectively show the variance $\sigma^2$ for the vertical and diagonal details.

As expected, the variance $\sigma^2$ is substantially higher in the case of the distribution of the wavelet coefficients deriving from the image of the original specimen than that computed from the statistical distributions of the wavelet coefficients deriving from the images of the colour copies.

Tests have been carried out on various original (i.e. authentic) specimens of banknotes and colour copies (i.e. counterfeits) thereof. These tests have shown that the method according to the present invention is very robust, especially when the image data of the region of interest being processed contains a relatively high density of intaglio-printed features, such as in the case of a portion of the portrait or of any other similarly dense pictorial representation that can be found on most banknotes (such as the intaglio-printed patterns representing architectural objects on the Euro banknotes). The tests have also shown that areas containing a lesser amount of intaglio feature still lead to good results.

Figure 15A:
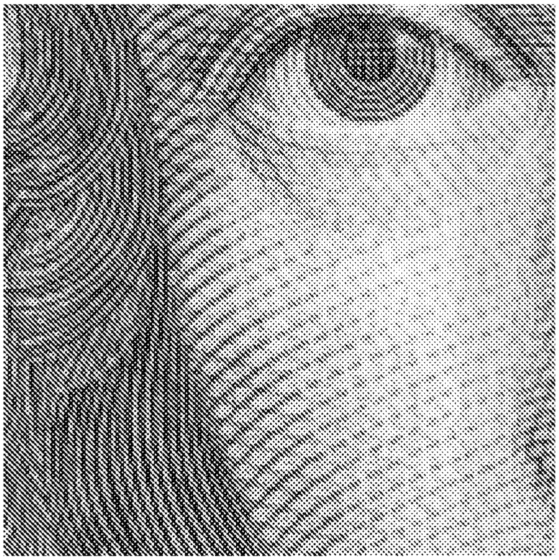
FIGS. 15*a* and 15*b* are two enlarged views of a part of the intaglio-printed portrait of Bettina von Arnim as it appears on the recto side of the DM 5 banknote which was issued during the years 1991 to 2001 in Germany prior to the introduction of the Euro.
Figure 15B:
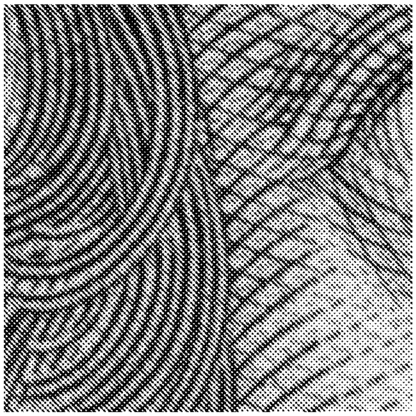

FIGS. 15*a* and 15*b* are two enlarged views of a part of the intaglio-printed portrait of Bettina von Arnim as it appears on the recto side of the DM 5 banknote which was issued during the years 1991 to 2001 in Germany prior to the introduction of the Euro. FIG. 15*b* in particular shows an example of a possible region of interest that was exploited for the purpose of authentication according to the above-described method.

Figure 16A:
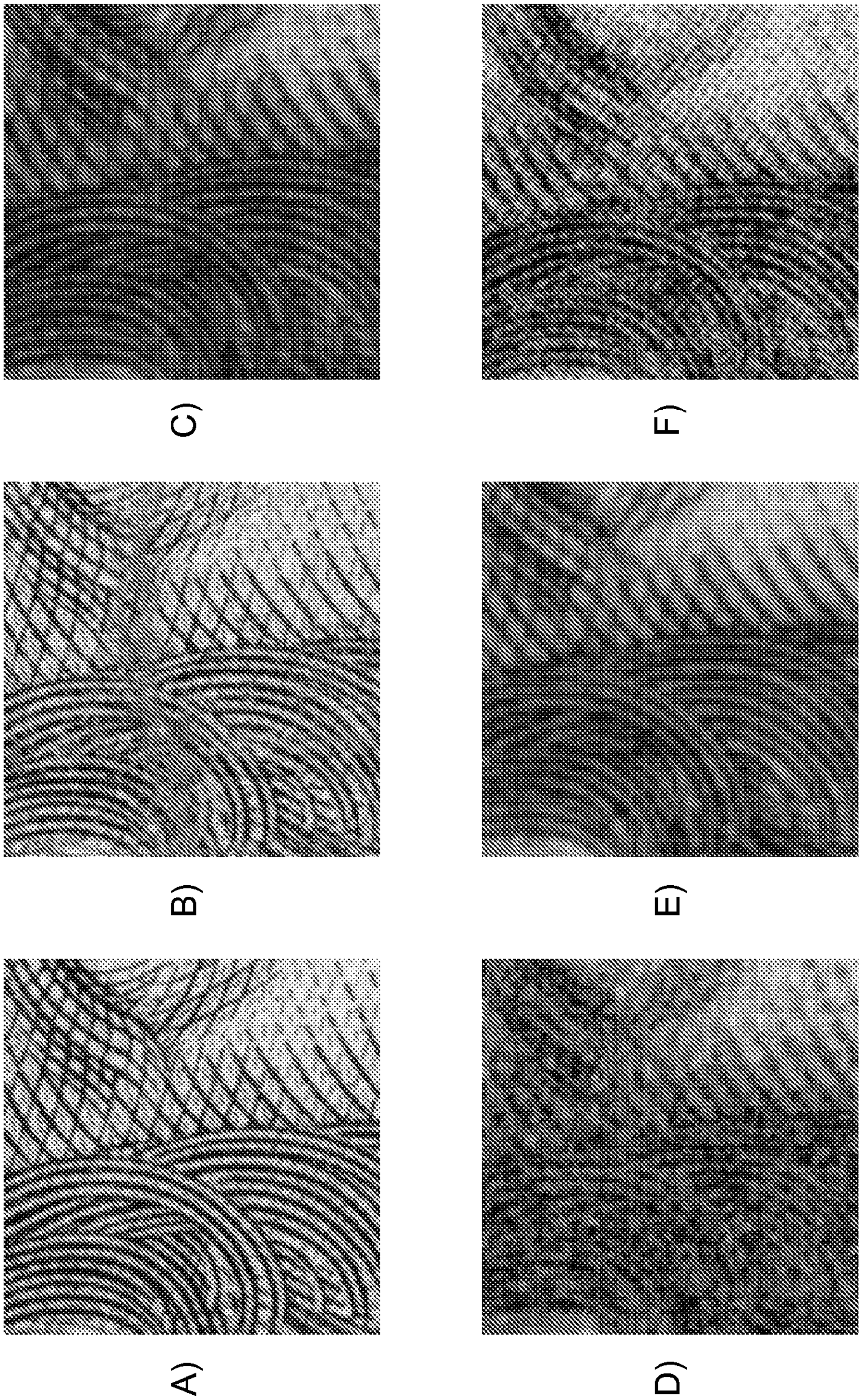
FIG. 16*a* is a view showing six greyscale scans of substantially the same region of two original specimens (illustrations A and B) and four colour copies (illustrations C to F) of the DM 5 banknote.

Several candidate documents have been tested including both original banknotes with different degrees of wear and colour copies of the banknotes which were produced using inkjet-, thermo-sublimation- as well as colour laser-copying and printing equipment. FIG. 16*a* shows for the purpose of illustration six similar images of the same region of interest taken from an original specimen in very good condition (illustration A), an original specimen with a relatively high degree of wear (illustration B), a colour-copy produced by inkjet printing on photo-quality paper at a resolution of 5600 dpi (illustration C), a colour-copy produced by inkjet printing on normal paper at a resolution of 5600 dpi (illustration D), a colour-copy produced by thermo-sublimation on photo-quality paper at a resolution of 300 dpi (illustration E) and a colour-copy produced by laser printing on normal paper at a resolution of 1200 dpi (illustration F).

Figure 16B:
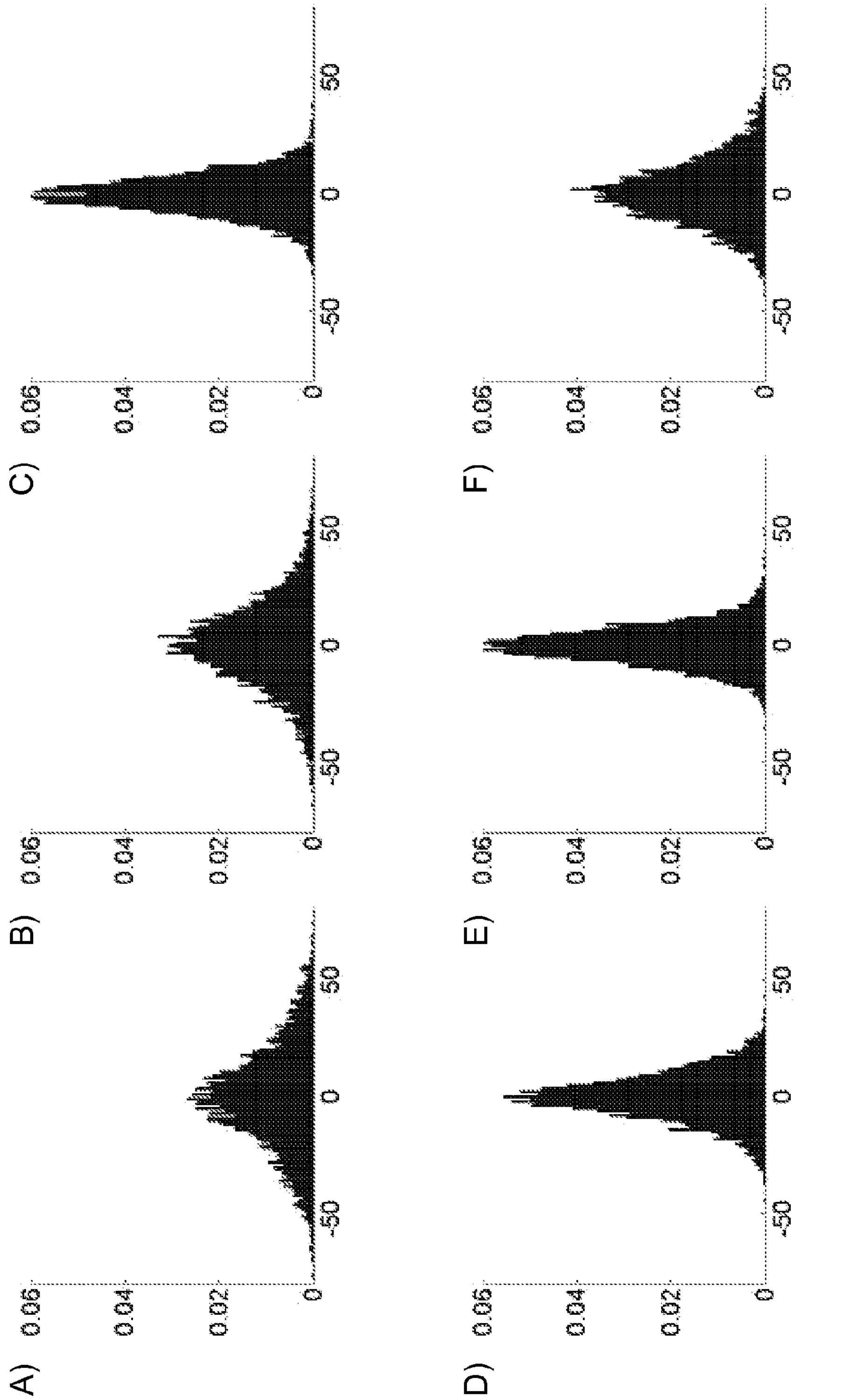
FIG. 16*b* shows six histograms illustrating the statistical distribution of the wavelet coefficients resulting from a one level wavelet transform of the images of FIG. 16*a*, each histogram showing the statistical distribution of combined wavelet coefficients (i.e. the combination of the horizontal details, the vertical details and the diagonal details)

FIG. 16*b* shows the corresponding histograms of the statistical distributions of the wavelet coefficients (in FIG. 16*b* the histograms are derived from the combination of the three detail images resulting from low-pass filtering of the images of FIG. 16*a*). One can see that the histograms computed from the images of the two original specimens (histograms A and B in FIG. 16*b*) are highly similar, despite the different degrees of wear of the specimens (and the presence of a wrinkle in the region of interest of the image of the second original specimen—see image B in FIG. 16*a*). The statistical distribution of the wavelet coefficients derived from the image of the two inkjet-printed copies and the thermo-sublimation copy (histograms C to E) are clearly different. The statistical distribution of the wavelet coefficients derived from the image of the laser-printed copy (histogram F) appears to be somewhat closer to that of the original specimens. However, the dispersion of the histogram corresponding to the laser-printed copy is still less than that of the original specimen. Moreover, all histograms corresponding to the colour copies (histograms C to F) exhibit clearly different amplitudes and peak shapes as compared to the histograms of the original specimens (histograms A and B).

Figure 17:
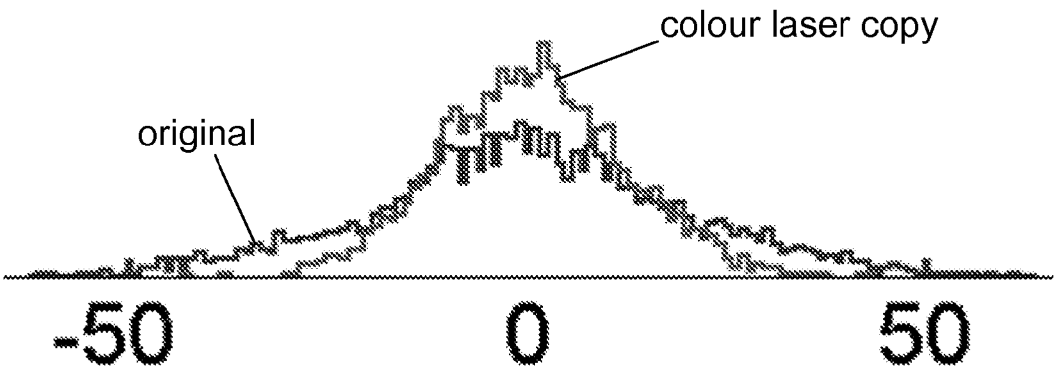
FIG. 17 is an illustrative superposition of the histograms of the upper left and lower right corners of FIG. 16*b;*

For the sake of illustration, FIG. 17 shows the superposition of the histograms corresponding to the first original specimen (histogram A in FIG. 16*b*) and to the laser-printed colour copy (histogram F in FIG. 16*b*).

Figure 18A:
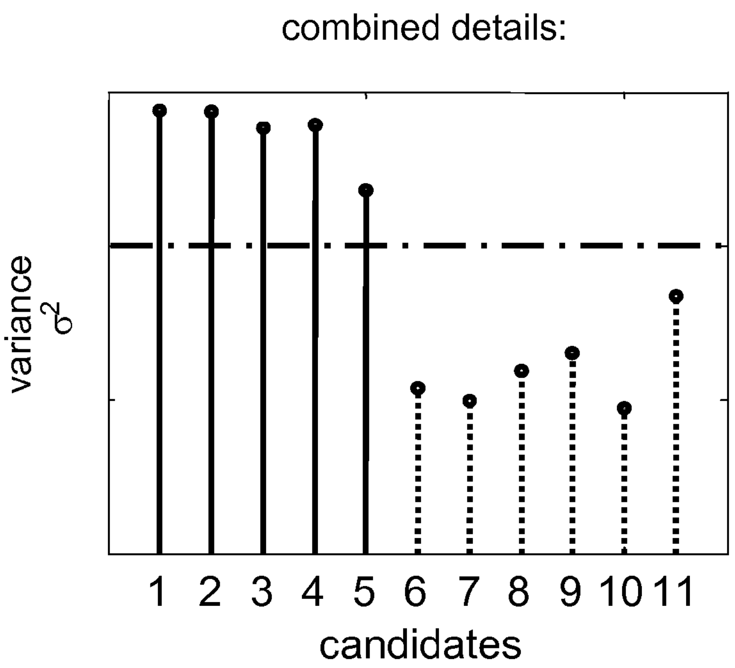
FIG. 18*a* is a bar chart illustrating the variance of the statistical distribution of the wavelet coefficients derived from the one-level wavelet transform of image data corresponding to the same region of interest (as illustrated in FIGS. 15*b* and 16*a*) of eleven candidate documents comprising five original specimens (candidates 1 to 5) and six colour copies (candidates 6 to 11) of the DM 5 banknote.
Figure 18B:
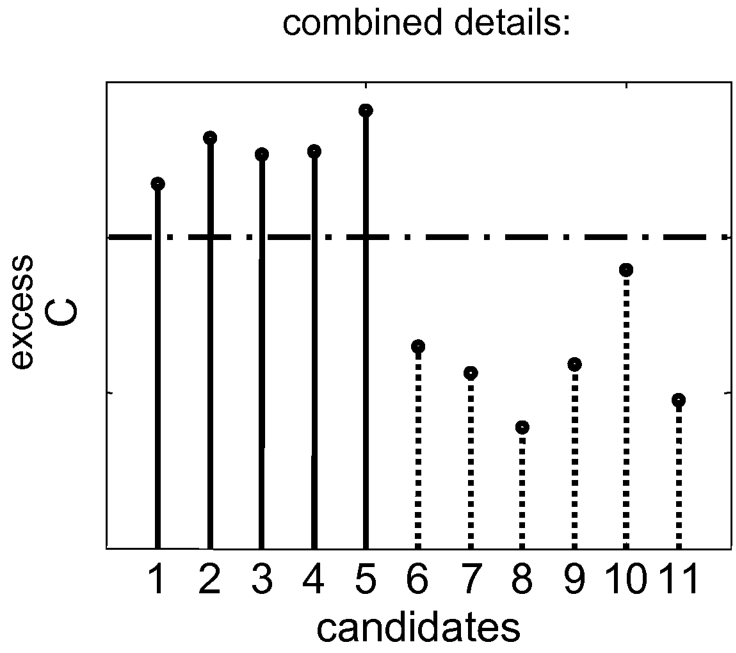
FIG. 18*b* is a bar chart illustrating the excess kurtosis, i.e. the measure of the "peakedness", of the statistical distribution of the wavelet coefficients derived from the one-level wavelet transform of image data corresponding to the same region of interest (as illustrated in FIGS. 15*b* and 16*a*) of the same eleven candidate documents of the DM 5 banknote as in FIG. 18*a;*

FIGS. 18*a* and 18*b* are two bar charts illustrating the variance $\sigma^2$ and the excess C, respectively, computed from the statistical distribution of the wavelet coefficients derived from images of substantially the same region of interest of eleven candidate documents comprising five original specimens with different degrees of wear (candidates 1 to 5) and six colour copies (candidates 6 to 11) produced by inkjet-printing, thermo-sublimation, or colour-laser-printing. In both cases, the variance $\sigma^2$ and the excess C clearly show that a distinction between the authentic documents and the counterfeits is possible using these two statistical parameters as classifying data.

Figure 19:
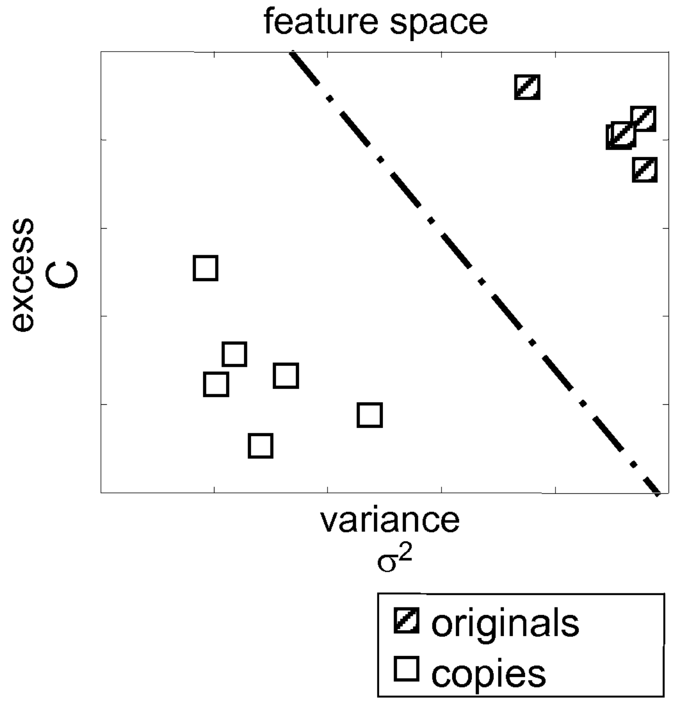
FIG. 19 is a schematic representation of an exemplary feature space used to classify candidate documents, wherein the variance and the excess kurtosis of the statistical distribution of the wavelet coefficients are used as (X; Y) coordinates to position the candidate documents in the said feature space.

For the sake of illustration, FIG. 19 is an illustration of a corresponding feature space using the variance $\sigma^2$ and the excess C as (X; Y) coordinates in the feature space, where the results derived from candidate documents can be positioned. A borderline can clearly be drawn between the points corresponding to original specimens (located on the upper right corner of the feature space) and those corresponding to colour copies (located on the lower left corner of the feature space).

Figure 20:
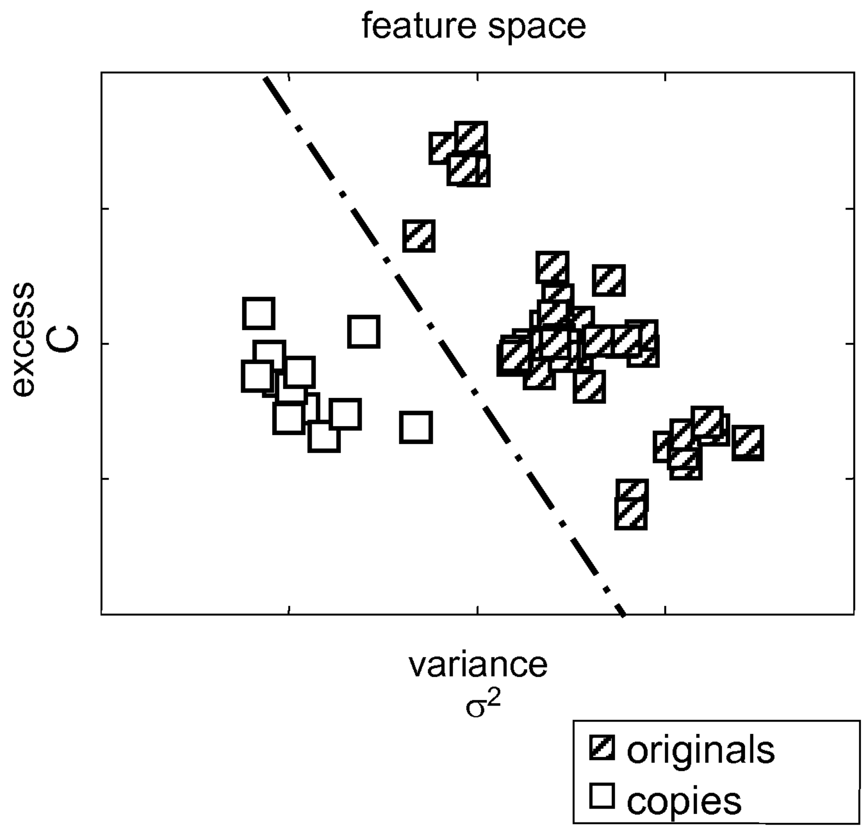
FIG. 20 is a schematic representation of an exemplary feature space similar to that of FIG. 19 where a plurality of candidates documents including original specimens and colour copies have been represented in the feature space using the variance and excess kurtosis as (X; Y) coordinates.

FIG. 20 is a view of a feature space similar to that of FIG. 19 where the variance $\sigma^2$ and the excess C are again used as (X; Y) coordinates and which shows the results that were obtained by processing additional candidate documents, including original Euro banknotes. These results confirm the robustness and efficiency of the authentication method according to the present invention.

It shall be appreciated that the method according to the invention does not as such require that the selected region of interest be strictly one and a same area of the candidate documents. As a matter of fact, deviations regarding the actual position of the region of interest from one candidate document to another do not substantially affect the results. The method according to the present invention is accordingly also advantageous in that it does not require precise identification and positioning of the region of interest prior to signal processing. This greatly simplifies the whole authentication process and its implementation (especially in ATM machines and the like) as one merely has to ensure that the selected region of interest more or less covers an area comprising a sufficiently representative amount of intrinsic features (in particular intaglio features).

Figure 22:
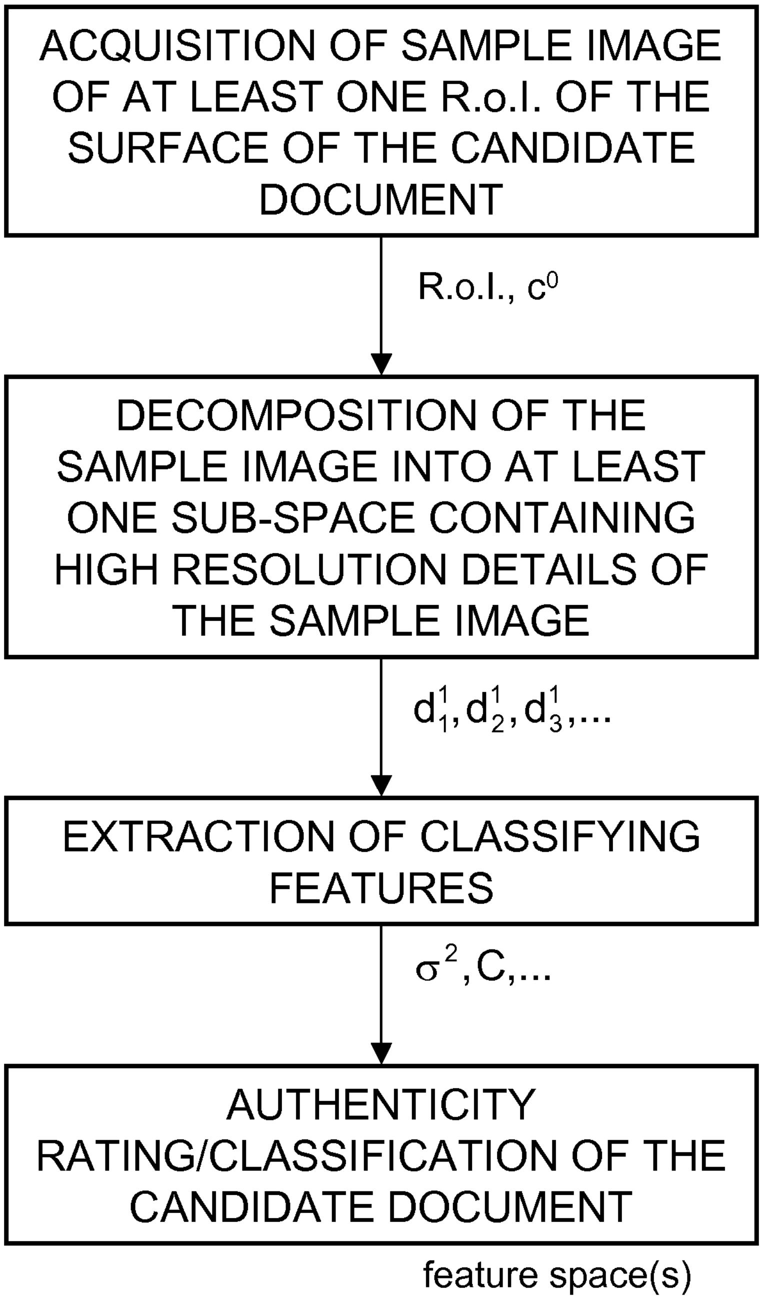
FIG. 22 is a summarizing flow-chart of the method according to the invention.

The above-described authentication method can thus be summarized, as illustrated by the flow chart of FIG. 22, as comprising the steps of:

- acquiring a sample image (i.e. image $c^0$) of at least one region of interest R.o.I. of the surface of a candidate document to be authenticated, which region of interest R.o.I. encompasses at least part of the security features;
- digitally processing the sample image $c^0$ by performing a decomposition of the sample image into at least one scale sub-space containing high resolution details of the sample image (e.g. at least one of the sub-images $d_1^m$, $d_2^m$, $d_3^m$, where m=1, 2, . . . , N, and N is the number of iterations performed) and extracting classifying features from the scale sub-space (e.g. the statistical parameter(s) about the statistical distribution of spectral coefficients); and
- deriving an authenticity rating (or classification) of the candidate document based on the extracted classifying features.

Figure 21:
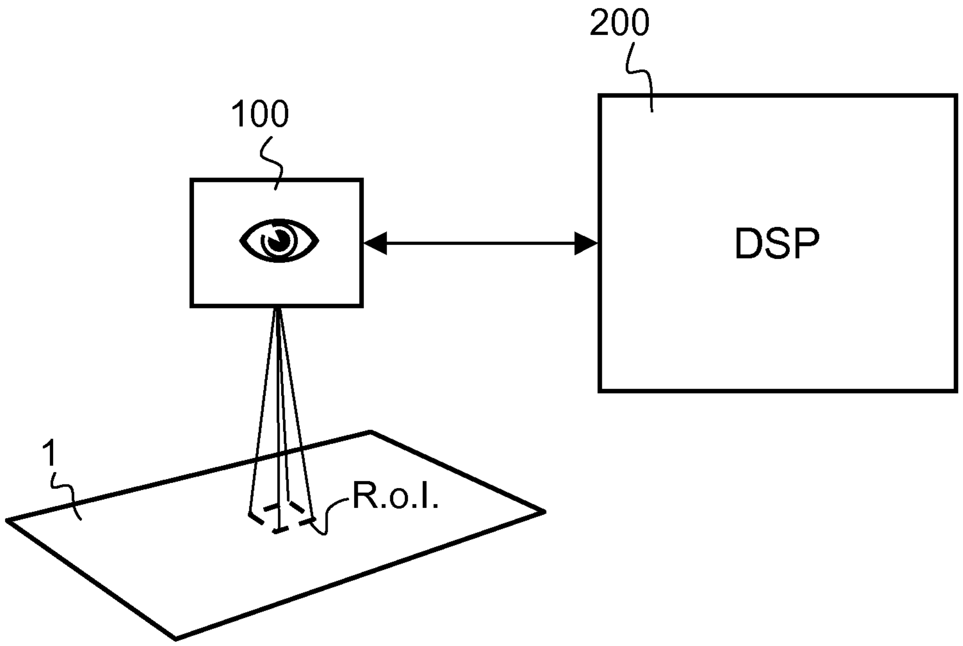
FIG. 21 is a schematic diagram of a device for checking the authenticity of security documents according to the method of the present invention.

FIG. 21 schematically illustrates an implementation of a device for checking the authenticity of security documents, in particular banknotes, according to the above-described method. This device comprises an optical system 100 for acquiring a sample image (image $c^0$) of the region of interest R.o.I. on a candidate document 1 to be authenticated, and a digital signal processing (DSP) unit 200 programmed for performing the digital processing of the sample image. The DSP 200 may in particular advantageously be implemented as a Field-Programmable-Gate-Array (FPGA) unit.

It will be appreciated that the above-described invention can be applied for simply detecting security features (in particular intaglio-printed patterns) printed, applied or otherwise provided on security documents, in particular banknotes, which security features comprise characteristic visual features intrinsic to the processes used for producing the security documents. By digitally processing a sample image of at least one region of interest of the surface of a candidate document as explained above which region of interest is selected to include at least a portion of the security features, (i.e. by performing one or more iterations of a multiresolution analysis of the sample image), one can extract classifying features which are characteristic of the security features.

As explained above, the classifying features may conveniently be statistical parameters selected from the group comprising the arithmetic mean, the variance ($\sigma^2$), the skewness, the excess (C), and the entropy of the statistical distribution of spectral coefficients representative of high resolution details of the sample image at a fine scale.

It shall further be appreciated that an authenticity rating computed according to the above described method can be optimised by designing the security features that are to be printed, applied, or otherwise provided on the security documents in such a way as to produce a characteristic response in the scale sub-space or sub-spaces containing high resolution details of the sample image that is processed.

Such optimisation can in particular be achieved by acting on security features including intaglio patterns, line offset patterns, letterpress patterns, optically-diffractive structures and/or combinations thereof. A high density of such patterns, preferably linear or curvilinear intaglio-printed patterns, as shown for instance in FIG. 2*b*, would in particular be desirable.

Various modifications and/or improvements may be made to the above-described embodiments without departing from the scope of the invention as defined by the annexed claims.

For instance, as already mentioned, while the authentication principle is preferably based on the processing of an image containing (or supposed to be containing) intaglio-printed patterns, the invention can be applied by analogy to the processing of an image containing other security features comprising characteristic visual features intrinsic to the processes used for producing the security documents, in particular line offset patterns, letterpress patterns, optically-diffractive structures and/or combinations thereof.

While wavelet transform has been discussed in the context of the above-described embodiments of the invention, it shall be appreciated that this particular transform is to be regarded as a preferred transform within the scope of the present invention. Other transforms are however possible such as the so-called chirplet transform. From a general point of view, any suitable transform can be used as long as it enables to perform a decomposition of the sample image into at least one scale sub-space containing high resolution details of the sample image.

In addition, it shall be understood that the above-described methodology can be applied in such a may as to decompose the sample image into more than one scale sub-space containing high resolution details of the sample image at different scales. In such case, classifying features could be extracted from each scale sub-space in order to characterize the candidate document being authenticated. In other words, the present invention is not limited to the decomposition of the sample image into only one scale sub-space containing high resolution details of the sample image.

Furthermore, while a processing of the statistical distribution of the spectral coefficients has been described as a way to extract classifying features for deriving an authenticity rating of the candidate document being authenticated, any other suitable processing could be envisaged as long as such processing enables to isolate and derive features that are sufficiently representative of the security features of authentic security documents.

The invention claimed is:

1. A method for checking the authenticity of security documents, in particular banknotes, wherein authentic security documents comprise security features printed, applied or otherwise provided on the security documents, which security features comprise characteristic visual features intrinsic to the processes used for producing the security documents, wherein the method comprises the steps of:

acquiring a sample image of at least one region of interest of the surface of a candidate document to be authenticated, which region of interest encompasses at least part of said security features;

digitally processing said sample image by performing a decomposition of the sample image into at least one scale sub-space containing high resolution details of the sample image and extracting classifying features from said scale sub-space, which extracted classifying features are used to position the candidate document in a feature space enabling a classification of the candidate document; and deriving an authenticity rating of the candidate document based on the extracted classifying features and the positioning of the candidate document in the feature space.

2. The method according to claim 1, wherein digitally processing the sample image includes:

performing a transform of said sample image to derive at least one set of spectral coefficients representative of the said high resolution details of the sample image at a fine scale; and processing said spectral coefficients to extract said classifying features.

3. The method according to claim 2, wherein said processing of the spectral coefficients includes performing a processing of the statistical distribution of the spectral coefficients.

4. The method according to claim 3, wherein said statistical processing includes computing at least one statistical parameter selected from the group comprising the arithmetic mean (first moment in statistics), the variance ($\sigma^2$, second moment in statistics), the skewness (third moment in statistics), the excess (C, fourth moment in statistics), and the entropy of the statistical distribution of said spectral coefficients.

5. The method according to claim 2, wherein said transform is a wavelet-transform.

6. The method according to claim 5, wherein said wavelet-transform is a discrete wavelet transform, preferably selected from the group comprising Haar-wavelet transform, Daubechies-wavelet transform, and Pascal-wavelet transform.

7. The method according to claim 1, wherein said decomposition of the sample image is performed as a result of one or more iterations of a multiresolution analysis of the sample image.

8. A method for checking the authenticity of security documents, in particular banknotes, wherein authentic security documents comprise security features printed, applied or otherwise provided on the security documents, which security features comprise characteristic visual features intrinsic to the processes used for producing the security documents, said method comprising the steps of:

digitally processing a sample image of at least one region of interest of the surface of a candidate document to be authenticated, which digital processing includes performing one or more iterations of a multiresolution analysis of the sample image to extract classifying features which are characteristic of said security features and which are used to position the candidate document in a feature space enabling classification of the candidate document; and deriving an authenticity rating of the candidate document based on the extracted classifying features and the positioning of the candidate document in the feature space.

9. The method according to claim 1, comprising digitally processing a plurality of sample images corresponding to several regions of interest of the same candidate document.

10. The method according to claim 1, wherein said sample image is acquired at a resolution lower than 600 dpi, preferably of 300 dpi.

11. The method according to claim 1, wherein said security features include intaglio patterns, line offset patterns, letterpress patterns, optically-diffractive structures and/or combinations thereof.

12. The method according to claim 1, wherein said security features include linear or curvilinear patterns of varying width, length and spacing.

13. The method according to claim 1, wherein said at least one region of interest is selected to include a high density of patterns, preferably linear or curvilinear intaglio-printed patterns.

14. The method according to claim 13, wherein said at least one region of interest is selected to include patterns of a pictorial representation, such as a portrait, provided on the candidate document.

15. A digital signal processing unit for processing image data of a sample image of at least one region of interest of the surface of a candidate document to be authenticated according to the method of claim 1, said digital signal processing unit being programmed for performing said digital processing of the sample image.

16. The digital signal processing unit of claim 15, implemented as an FPGA (Field-Programmable-Gate-Array) unit.

17. A device for checking the authenticity of security documents, in particular banknotes, according to the method of claim 1, comprising an optical system for acquiring the sample image of the region of interest and a digital signal processing unit programmed for performing the digital processing of the sample image.

18. The device according to claim 17, wherein said digital signal processing unit is implemented as an FPGA (Field-Programmable-Gate-Array) unit.

19. A method for producing security documents, in particular banknotes, comprising the step of designing security features to be printed, applied, or otherwise provided on the security documents, wherein said security features are designed in such a way as to optimise an authenticity rating computed according to the method of claim 1 by producing a characteristic response in the said at least one scale sub-space.

20. The method according to claim 19, wherein said security features include intaglio patterns, line offset patterns, letterpress patterns, optically-diffractive structures and/or combinations thereof.

21. The method according to claim 19, wherein said security features are designed such as to include a high density of patterns, preferably linear or curvilinear intaglio-printed patterns.

22. A method for detecting security features printed, applied or otherwise provided on security documents, in particular banknotes, which security features comprise characteristic visual features intrinsic to the processes used for producing the security documents, said method comprising the step of digitally processing a sample image of at least one region of interest of the surface of a candidate document, which region of interest is selected to include at least a portion of said security features, which digital processing includes performing one or more iterations of a multiresolution analysis of the sample image to extract classifying features which are characteristic of said security features and which are used to position the candidate document in a feature space enabling a classification of the candidate document.

23. The method according to claim 22, for detecting intaglio-printed patterns.

24. The method according to claim 22, wherein said classifying features are statistical parameters selected from the group comprising the arithmetic mean (first moment in statistics), the variance ($\sigma^2$, second moment in statistics), the skewness (third moment in statistics), the excess (C, fourth moment in statistics), and the entropy of the statistical distribution of spectral coefficients representative of high resolution details of the sample image at a fine scale.

25. The method according to claim 8, comprising digitally processing a plurality of sample images corresponding to several regions of interest of the same candidate document.

26. The method according to claim 8, wherein said sample image is acquired at a resolution lower than 600 dpi, preferably of 300 dpi.

27. The method according to claim 8, wherein said security features include intaglio patterns, line offset patterns, letterpress patterns, optically-diffractive structures and/or combinations thereof.

28. The method according to claim 8, wherein said security features include linear or curvilinear patterns of varying width, length and spacing.

29. The method according to claim 8, wherein said at least one region of interest is selected to include a high density of patterns, preferably linear or curvilinear intaglio-printed patterns.

30. The method according to claim 29, wherein said at least one region of interest is selected to include patterns of a pictorial representation, such as a portrait, provided on the candidate document.

31. A digital signal processing unit for processing image data of a sample image of at least one region of interest of the surface of a candidate document to be authenticated according to the method of claim 8, said digital signal processing unit being programmed for performing said digital processing of the sample image.

32. The digital signal processing unit of claim 31, implemented as an FPGA (Field-Programmable-Gate-Array) unit.

33. A device for checking the authenticity of security documents, in particular banknotes, according to the method of claim 8, comprising an optical system for acquiring the sample image of the region of interest and a digital signal processing unit programmed for performing the digital processing of the sample image.

34. The device according to claim 33, wherein said digital signal processing unit is implemented as an FPGA (Field-Programmable-Gate-Array) unit.

35. The method according to claim 4, wherein the variance and the excess are used as coordinates to position the candidate document in the feature space.

36. The method according to claim 8, wherein said classifying features are statistical parameters selected from the group comprising the arithmetic mean (first moment in statistics), the variance (σ2, second moment in statistics), the skewness (third moment in statistics), the excess (C, fourth moment in statistics), and the entropy of the statistical distribution of spectral coefficients representative of high resolution details of the sample image at a fine scale.

37. The method according to claim 36, wherein the variance and the excess are used as coordinates to position the candidate document in the feature space.

38. The method according to claim 24, wherein the variance and the excess are used as coordinates to position the candidate document in the feature space.

39. The method according to claim 1, for checking the authenticity of security documents produced by intaglio printing, wherein authentic security documents comprise security features printed on the security documents by intaglio printing, which security features include intaglio-printed patterns that comprise characteristic visual features intrinsic to the intaglio printing process used for producing the security documents.

40. The method according to claim 8, for checking the authenticity of security documents produced by intaglio printing, wherein authentic security documents comprise security features printed on the security documents by intaglio printing, which security features include intaglio-printed patterns that comprise characteristic visual features intrinsic to the intaglio printing process used for producing the security documents.

* * * * *